(12) United States Patent
Sakasai et al.

(10) Patent No.: US 6,348,743 B1
(45) Date of Patent: Feb. 19, 2002

(54) VOLTAGE CONTROL APPARATUS OF ENGINE GENERATOR AND CONTROL METHOD THEREOF

(75) Inventors: Takashi Sakasai, Obusuma Showa-machi; Norifumi Abe, Oyama, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/567,972

(22) Filed: May 10, 2000

(30) Foreign Application Priority Data

May 13, 1999 (JP) ............................................ 11-132615

(51) Int. Cl.[7] .............................................. H02P 9/04
(52) U.S. Cl. .................................... 290/40 B; 290/40 A
(58) Field of Search .............................. 290/40 A, 40 B, 290/40 C, 40 R, 51, 17; 322/14, 29

(56) References Cited

U.S. PATENT DOCUMENTS

| | | | | |
|---|---|---|---|---|
| 3,999,388 A | * | 12/1976 | Nystrom ...................... | 60/521 |
| 4,019,478 A | * | 4/1977 | Hobo et al. .................. | 123/501 |
| 4,463,267 A | * | 7/1984 | Bools ........................ | 290/40 R |
| 4,520,272 A | * | 5/1985 | Danno et al. ............... | 290/40 A |
| 4,668,872 A | * | 5/1987 | Lerouge et al. ............ | 290/40 R |
| 4,708,112 A | * | 11/1987 | Nanjyo et al. .............. | 123/357 |
| 5,170,065 A | * | 12/1992 | Shimizu et al. ............ | 290/40 C |
| 5,623,909 A | * | 4/1997 | Wertheimer ................ | 123/501 |
| 5,915,356 A | * | 6/1999 | Oishi et al. ................. | 123/357 |
| 6,018,200 A | * | 1/2000 | Anderson et al. .......... | 290/40 B |
| 6,121,691 A | * | 9/2000 | Renner ..................... | 290/40 A |

FOREIGN PATENT DOCUMENTS

| | | | |
|---|---|---|---|
| GB | 2 080 975 A | * | 2/1982 |
| JP | 5-111298 A | | 4/1993 |

* cited by examiner

Primary Examiner—Joseph Waks
(74) Attorney, Agent, or Firm—Sidley Austin Brown & Wood

(57) ABSTRACT

The invention provides a voltage control apparatus of an engine generator having a simple structure and capable of being made compact, and a control method thereof. Accordingly, in a method of controlling a voltage of an engine generator, the method includes steps of detecting an actually measured value (Ne) of an engine rotational speed at every predetermined time and controlling an output voltage of the power generator (4) in accordance with a deviation value ($\alpha 1$) between a predetermined target value (Ne1) and the actually measured value when the actually measured value is equal to or less than the target value. Further, the method includes the steps of detecting an actually measured value (Q) of a fuel injection amount of an engine (1) and an actually measured value (Ne) of a rotational speed at every predetermined time and controlling an output voltage of the power generator in accordance with a deviation value ($\alpha 2$) between a predetermined target value (Q1) of the fuel injection amount with respect to the actually measured value of the rotational speed and the actually measured value of the fuel injection amount. Further, the method can be made such as to detect the actually measured value of the engine rotational speed at every predetermined time and control the output voltage of the power generator on the basis of the time change rate of the actually measured value.

14 Claims, 11 Drawing Sheets

VOLTAGE CONTROL APPARATUS OF ENGINE GENERATOR AND CONTROL METHOD THEREOF

FIELD OF THE INVENTION

The present invention relates to a voltage control apparatus of an engine generator which controls an output voltage of an automatic voltage regulator (AVR) of an engine generator, and a control method thereof.

BACKGROUND OF THE INVENTION

An engine generator is widely used as a movable power source in a field of construction work or the like, an emergency power source in a building, a plant, a hospital or the like, or a permanent power source in an area where a commercial power source can not be obtained. In the engine generator, when a load suddenly increases due to a load input, an output of an engine driving the power generator can not follow an increase of the load, so that an engine rotational speed is largely reduced in a moment. Since this reduction of the engine rotational speed gives a bad influence to the load maintained in the power generator, it is defined so as to set a reduction rate with respect to a rated rotational speed and a time required after the rotational speed is reduced and before being returned to the rated rotational speed to be within a predetermined range.

When the load of the engine generator is suddenly increased, the engine rotational speed is reduced and a governor is operated in accordance therewith so as to increase a fuel injection amount. However, since the power generator is generally driven by an engine with a supercharger, an increase of a pressure of a supplied air is delayed in comparison with an increase of a fuel injection amount. Accordingly, a recovery of the engine rotational speed is delayed. Then, a lot of techniques for quickening a recovery of the engine rotational speed have been conventionally suggested. For example, in accordance with a technique disclosed in Unexamined Japanese Patent Publication No. 5-111298, an output voltage control for reducing an energizing current of an automatic voltage regulator only for a fixed time at a fixed rate so as to descend an output voltage thereof is performed as means for temporarily reducing a load applied to the power generator.

However, since the control in accordance with the technique mentioned above is performed by a load information in the power generator side such as the output current or the output power of the power generator and the like, an output current sensor, an output power detector and the like are required. Since the load of the power generator generally corresponds to a great energy, and the output voltage value and the output current value correspond to great values, the output current sensor, the output power detector and the like for detecting them are set to be a large scale having a great energy resisting amount. Accordingly, the control apparatus tends to be formed in a large scale, a structure thereof is complex and a cost therefor is increased. Further, a large space for placing the sensors and the control apparatus is required and it is hard to make the engine generator compact.

SUMMARY OF THE INVENTION

The present invention is made by taking the problems mentioned above in the prior art into consideration, and an object of the present invention is to provide a voltage control apparatus of an engine generator having a simple structure and capable of being made compact, and a control method thereof.

In order to achieve the object mentioned above, in accordance with a first aspect of the present invention, there is provided a method of controlling a voltage of an engine generator comprising the steps of:

detecting an actually measured value of an engine rotational speed at every predetermined time; and controlling an output voltage of the power generator in accordance with a deviation value between a predetermined target value and the actually measured value when the actually measured value is equal to or less than the target value.

In accordance with the first aspect, since a degree of the load applied to the power generator is judged on the basis of the engine rotational speed and the output voltage of the power generator is controlled in accordance with the deviation value between the predetermined target value and the actually measured value of the rotational speed, that is, in accordance with a degree of change of the rotational speed, it is possible to reduce the output voltage in accordance with a magnitude of the sudden load change. Accordingly, since the control is not performed by detecting the output current, the output power or the like in the power generator side which is employed in the conventional art, it is possible to restrict a change width and a change time of the output voltage, the frequency and the like of the power generator to a minimum limit at a sudden load transient time so as to move to a stable operation by utilizing the rotational speed detector particularly in the case that an electronic governor is provided. In general, since the rotational speed detector has a small energy resisting amount and is compact, it is possible to manufacture the control apparatus in accordance with the voltage control method at a low cost and in such a manner as to be compact.

In accordance with a second aspect of the present invention, there is provided a method of controlling a voltage of an engine generator comprising the steps of:

detecting an actually measured value of a fuel injection amount of an engine and an actually measured value of a rotational speed at every predetermined time; and controlling an output voltage of the power generator in accordance with a deviation value between a predetermined target value of the fuel injection amount with respect to the actually measured value of the rotational speed and the actually measured value of the fuel injection amount.

In accordance with the second aspect, since a degree of the load applied to the power generator is judged on the basis of the fuel injection amount of the engine and the output voltage of the power generator is controlled in accordance with the deviation value between the target value of the fuel injection amount with respect to the actually measured value of the rotational speed of the engine and the actually measured value of the fuel injection amount, that is, in accordance with a degree of change of the fuel injection amount, it is possible to reduce the output voltage in accordance with a magnitude of the sudden load change. At this time, since it is possible to control the output voltage of the power generator even when the actually rotational speed is higher than the target value of the rotational speed in the first aspect, that is, an engine rotational speed for starting control, it is possible to detect a load increase in the power generator at an early time so as to reduce the load. Accordingly, since the control is not performed by detecting the output current, the output power or the like in the power generator side which is employed in the conventional art, it is possible to restrict a change width and a change time of the output voltage, the frequency and the like of the power generator to a minimum limit at a sudden load transient time so as to move to a stable operation by utilizing the rotational speed detector and the fuel injection amount detecting means particularly in the case that an electronic governor is provided. In general, since the rotational speed detector and the fuel injection amount detecting means has a small energy resisting amount and is compact, it is possible to manufacture the control apparatus in accordance with the voltage control method at a low cost and in such a manner as to be compact.

In accordance with a third aspect of the present invention, there is provided a method of controlling a voltage of an engine generator comprising the steps of:

detecting an actually measured value of a rotational speed of an engine and an actually measured value of a fuel injection amount at every predetermined time;

controlling an output voltage of the power generator in accordance with a deviation value between a predetermined target value of the fuel injection amount with respect to the actually measured value of the rotational speed and the actually measured value of the fuel injection amount when the actually measured value of the rotational speed is greater than the predetermined target value; and controlling the output voltage of the power generator in accordance with a deviation value between a predetermined target value and the actually measured value of the rotational speed when the actually measured value of the rotational speed is equal to or less than the predetermined target value.

In accordance with the third aspect, since the degree of the load of the power generator is judged on the basis of the rotational speed of the engine and the fuel injection amount and the output voltage of the power generator is controlled in accordance with the deviation value of the rotational speed and the deviation value of the fuel injection amount, that is, in accordance with the degree of change of both of the rotational speed and the fuel injection amount, it is possible to perform a control having an improved response and a high accuracy.

In particular, since an output voltage of a power generator is controlled in accordance with a target value Q1 and an actually measured value Q of a fuel injection amount when an actually measured value Ne of the rotational speed is not reduced to a predetermined target value Ne1, it is possible to early know an increase of load so as to immediately reduce the load, thereby controlling with an improved response at a transient time when the load of the power generator is suddenly changed. Further, since the output voltage of the power generator is controlled in accordance with the target value Ne1 and the actually measured value Ne of the rotational speed when the actually measured value Ne of the rotational speed is reduced to a level equal to or less than the target value Ne1, the rotational speed is securely controlled to be restored to a value equal to or more than the target value Ne1, whereby it is possible to accurately control at a sudden load transient time. Accordingly, since the control is not performed by detecting the output current, the output power or the like in the power generator side which has been performed in the prior art, in particular in the case that the electronic governor is attached, it is possible to restrict a change range and a change time of the output voltage, the frequency and the like in the power generator at a sudden load transient time to a minimum limit by utilizing the rotational speed detector and the fuel injection amount detecting means so as to move a stable operation. In general, since the rotational speed detector has a small energy resisting amount and is compact, it is possible to manufacture the control apparatus in accordance with the voltage control method at an inexpensive cost and in a compact size.

In accordance with a fourth aspect of the present invention, there is provided a method of controlling a voltage of an engine generator as cited in the second aspect or the third aspect, wherein when controlling the output voltage of the power generator in accordance with the deviation value between the predetermined target value of the fuel injection amount with respect to the actually measured value of the rotational speed and the actually measured value of the fuel injection amount, in the case that the actually measured value of the fuel injection amount is equal to the predetermined target value, the output voltage of the power generator is controlled in accordance with the deviation value between the predetermined target value of the rotational speed and the actually measured value thereof.

In accordance with the fourth aspect, since the structure is made such as to finish the control on the basis of the deviation value of the fuel injection amount and immediately control in accordance with the deviation value of the rotational speed in the case that a target value Q1 of the fuel injection amount and an actually measured value Q thereof are equal to each other when controlling the output voltage of the power generator in accordance with the deviation value between the target value Q1 and the actually measured value Q, it is possible to securely control the rotational speed to a level equal to or more than a predetermined target value. Accordingly, it is possible to accurately move the sudden load transient characteristic of the power generator to a stable operation.

In accordance with a fifth aspect of the present invention, there is provided a method of controlling a voltage of an engine generator as cited in the first aspect, the second aspect or the third aspect, wherein when the actually measured value of the engine rotational speed is equal to or more than a second target value lower than the first target value, a state having a rotational speed lower than the first target value continues and the continuing time is over a predetermined first threshold during the output voltage control of the power generator, a control of returning the power generator to a rated output voltage is performed.

In accordance with the fifth aspect, when the actually measured value of the engine rotational speed is lower than the first target value and the state of being equal to or more than the second target value continues for the predetermined time or more, the voltage adjustment function by the automatic voltage adjuster is operated so as to be controlled to the rated voltage by performing the control of returning the voltage from the output voltage which is lower than the rated voltage to the rated voltage. Accordingly, since the time for which the power generator outputs the voltage which is lower than the rated voltage becomes within the predetermined time, it is possible to control the output voltage reduction time of the power generator in a standard manner, and it is also possible to restrict the change of the output voltage.

In accordance with a sixth aspect of the present invention, there is provided a method of controlling a voltage of an engine generator as cited in the first aspect, the second aspect or the third aspect, wherein when the output voltage of the power generator is controlled to be returned from the voltage lower than the rated voltage to the rated voltage, it is possible to control to the output voltage lower than the rated voltage after the continuing time is over the predetermined second threshold.

In accordance with the sixth aspect, after returning the output voltage of the power generator to the rated voltage, the output voltage is kept to be set to the rated voltage value until the predetermined time has passed, and it is possible to control to the output voltage lower than the rated voltage after the predetermined time has passed. In general, a reduction of the engine rotational speed is generated when returning the output voltage to the rated voltage and there is a risk that the output voltage control is again performed, however, in accordance with the present invention, since the restoration of the engine rotational speed is performed with keeping the rated voltage at a time when the rotational speed is reduced immediately after being returned to the rated voltage, the output voltage is not frequently changed in accordance with the present control. Accordingly, it is possible to stabilize the output voltage of the power generator.

Further, in accordance with a seventh aspect, there is provided an engine generator having an engine, a power generator driven by the engine, and an automatic voltage adjuster which inputs an output voltage of the power generator and an adjustment voltage command value from an external portion so as to control the output voltage of the power generator in correspondence to the input adjustment voltage command signal, wherein the engine generator comprising an engine rotational speed detector which detects a rotational speed of the engine, an engine controller which outputs an adjustment voltage command value of the automatic voltage adjuster in correspondence to a deviation value between an actually measured value by the engine rotational speed detector and a predetermined target value, a predetermined number of resistances obtained by connecting a combined resistance formed by a predetermined parallel and series to an adjustment voltage connection in anyone of command input terminal of the automatic voltage adjuster, and switch means which can switch the predetermined connection of the resistances in correspondence to the adjustment voltage command value of the engine controller.

In accordance with the seventh aspect, since a degree of the load applied to the power generator is judged on the basis of the engine rotational speed and the output voltage of the power generator is controlled in correspondence to the deviation value between the predetermined target value of the rotational speed and the actually measured value, that is, the degree of the change of the rotational speed, it is possible to the reduce the output voltage in correspondence to the magnitude of the sudden load change so as to lighten the load. Accordingly, it is possible to restrict the change width and the change time of the output voltage, the frequency and the like of the power generator to a minimum limit at the sudden load transient time by utilizing the rotational speed detector without detecting the output current, the output power or the like in the power generator side which is performed in the prior art, whereby it is possible to move to the stable operation. Accordingly, it is possible to obtain the voltage control apparatus of the engine generator which can be manufactured to be compact in a simple structure and at a low cost.

Further, a plurality of resistances and a plurality of switch means are combined and input to the adjustment voltage input terminal of the automatic voltage adjuster. As mentioned above, the input circuit is a significantly simple structure, however, since the combined resistance comprising a plurality of resistances is switched by turning on or off a plurality of switch means, it is possible to input the adjustment voltage command having multiple stages to the automatic voltage adjuster. Accordingly, it is possible to accurately control the output voltage of the power generator by a simple structure in correspondence to the rotational speed of the engine and/or the deviation value of the fuel injection amount.

In accordance with an eighth aspect, there is provided an engine generator having an engine, a power generator driven by the engine, and an automatic voltage adjuster which inputs an output voltage of the power generator and an adjustment voltage command value from an external portion so as to control the output voltage of the power generator in correspondence to the input adjustment voltage command signal, wherein the engine generator comprising an engine rotational speed detector which detects a rotational speed of the engine, fuel injection amount detecting means which detects a fuel injection amount of the engine, an engine controller which outputs an adjustment voltage command value of the automatic voltage adjuster in correspondence to a deviation value between a target value of the fuel injection amount with respect to an actually measured value of the rotational speed by the engine rotational speed detector and an actually measured value of the fuel injection amount by the fuel injection amount detecting means, a predetermined number of resistances obtained by connecting a combined resistance formed by a predetermined parallel and series to an adjustment voltage connection in anyone of command input terminal of the automatic voltage adjuster, and switch means which can switch the predetermined connection of the resistances in correspondence to the adjustment voltage command value of the engine controller.

In accordance with the eighth aspect, since a degree of the load applied to the power generator is judged on the basis of the engine fuel injection amount and the output voltage of the power generator is controlled in correspondence to the deviation value between the target value of the fuel injection amount with respect to the actually measured value of the engine rotational speed and the actually measured value of the fuel injection amount, that is, the degree of the change of the fuel injection amount, it is possible to the reduce the output voltage in correspondence to the magnitude of the sudden load change so as to lighten the load. At this time, since it is possible to control the output voltage of the power generator even in the case that the actual rotational speed is over the target value of the rotational speed in the first aspect, that is, the control start engine rotational speed, it is possible to know the load increase of the power generator at an early time so as to lighten the load. Accordingly, it is possible to restrict the change width and the change time of the output voltage, the frequency and the like of the power generator to a minimum limit at the sudden load transient time by utilizing the rotational speed detector and the fuel injection amount detecting means without detecting the output current, the output power or the like in the power generator side which is performed in the prior art, whereby it is possible to move to the stable operation. Accordingly, it is possible to obtain the voltage control apparatus of the engine generator which can be manufactured to be compact in a simple structure and at a low cost.

Further, a plurality of resistances and a plurality of switch means are combined and input to the adjustment voltage input terminal of the automatic voltage adjuster. Accordingly, the input circuit is a significantly simple structure, however, it is possible to input the adjustment voltage command having multiple stages to the automatic voltage adjusted by turning on or off a plurality of switch means. Accordingly, it is possible to accurately control the output voltage of the power generator by a simple structure in correspondence to the rotational speed of the engine and/or the deviation value of the fuel injection amount.

In accordance with a ninth aspect of the present invention, there is provided a method of controlling a voltage of an engine generator comprising the steps of:

detecting an actually measured value of an engine rotational speed at every predetermined time; and controlling an output voltage of the power generator on the basis of a time change rate of the actually measured value.

In accordance with the ninth aspect, since a degree of the load is judged on the basis of the time change rate of the actually measured engine rotational speed and the output voltage of the power generator is controlled in accordance with a magnitude of the load, it is possible to improve a response in comparison with the output voltage control in accordance with the deviation value of the injection amount mentioned above. That is, since the control amount in accordance with the deviation value of the injection amount is calculated on the basis of the result of the reduction of the engine rotational speed, it is possible to know the change in time in the case of being controlled in accordance with the time change rate of the engine rotational speed in comparison with the case of being controlled in accordance with the deviation value of the injection amount. Accordingly, since the time control can be earlier started even at the sudden load time so as to improve the response of the control, in accordance with the time change rate of the engine rotational speed, the reduction rate of the output voltage of the power generator is not increased, and the engine rotational speed can be early restored. Further, since no injection amount detector is required and it is possible to use the engine rotational speed detector employed for controlling the engine rotational speed, it is possible to more easily construct the control apparatus.

In accordance with a tenth aspect of the present invention, there is provided a method of controlling a voltage of an engine generator as cited in the ninth aspect, wherein when the time change rate of the actually measured value of the engine rotational speed is reduced to a level equal to or less than a predetermined value, the output voltage control of the power generator is started.

In accordance with the tenth aspect, since it is judged that the load is increased when the time change rate of the actual engine rotational speed is reduced to a level equal to or less than a predetermined value NT1, it is possible to know the load change earlier than the case of being controlled in accordance with the deviation value of the injection amount and to start the output voltage control of the power generator earlier even at the sudden load time. Accordingly, since the response of the control is improved, it is possible to early restore the engine rotational speed.

In accordance with an eleventh aspect of the present invention, there is provided a method of controlling a voltage of an engine generator as cited in the ninth aspect, wherein the control is performed by changing the output voltage value of the power generator in accordance with the time change rate of the actually measured value of the engine rotational speed.

In accordance with the eleventh aspect, since the output voltage control is performed by judging that the load is large so as to set the output voltage value of the power generator low when the time change rate of the actual engine rotational speed is large and judging that the load is small so as to set the output voltage value of the power generator high when it is inversely small, the output voltage value can be set optimum in accordance with the load. Accordingly, it is possible to stably restore the engine rotational speed for a short time in spite of the degree of the load.

In accordance with a twelfth aspect of the present invention, there is provided a method of controlling a voltage of an engine generator as cited in the ninth aspect, the tenth aspect or the eleventh aspect, wherein the output voltage is maintained until at least third threshold or more of the control time has passed after starting the output voltage control of the power generator.

In accordance with the twelfth aspect, since in the case that the load of the power generator is small, the output voltage is maintained until at least the third threshold T3 or more of the control time has passed even when the engine rotational speed is restored for a short time after starting the output voltage control of the power generator, it is possible to securely restore the output voltage without changing the output voltage at a degree equal to or more than necessity.

In accordance with a thirteenth aspect of the present invention, there is provided a method of controlling a voltage of an engine generator as cited in the ninth aspect, the tenth aspect or the eleventh aspect, wherein when first threshold or more of the control time has passed after starting the output voltage control of the power generator, the output voltage control is stopped and a control of returning to the rated output voltage is performed.

In accordance with the thirteenth aspect, since the voltage reduction in accordance with the output voltage control of the power generator continues only a time equal or less than the first threshold T1 of the control time, it is possible to confirm the output voltage with the standard of the power generator and to secure a stability of the voltage of the power generator.

In accordance with a fourteenth aspect of the present invention, there is provided a method of controlling a voltage of an engine generator as cited in the thirteenth aspect, wherein when the actually measured value of the engine rotational speed becomes equal to or more than a predetermined fourth target value during the output voltage control, the output voltage control is stopped and a control of returning to the rated output voltage is performed.

In accordance with the fourteenth aspect, since the output voltage is returned to the rated output voltage when the actually measured value Ne of the engine rotational speed becomes equal to or more than a predetermined fourth target value (NeR−N4) after starting the output voltage control of the power generator, it is possible to securely restore the output voltage without reducing the output voltage at a degree equal to or more than necessity.

In accordance with a fifteenth aspect of the present invention, there is provided a method of controlling a voltage of an engine generator as cited in the thirteenth aspect, wherein the output voltage control is continued when the actually measured value of the engine rotational speed becomes equal to or less than a predetermined first target value during the output voltage control, and the output voltage control is stopped and a control of returning to the rated output voltage is performed when a third threshold shorter than the first threshold of the control time has passed after starting the output voltage control and the actually measured value of the engine rotational speed becomes equal to or more than a predetermined fourth target value higher than the predetermined first target value.

In accordance with the fifteenth aspect, since the voltage control is maintained until the third threshold T3 of the control time has passed after starting the output voltage control of the power generator, the output voltage can be stabilized without changing the output voltage even when the load is reduced for a short time. Further, after the third threshold T3 has passed, since the output voltage control is stopped when the actually measured value of the engine rotational speed becomes equal to or more than the fourth threshold N4 higher than the first threshold of the engine rotational speed, the output voltage control can be stabilized in accordance with a hysteresis characteristic of the monitored engine rotational speed and the output voltage is returned to the rated output voltage after the rotational speed is securely restored to the original value. Accordingly, it is possible to securely stabilize the output voltage.

DETAILED DESCRIPTION OF THE PREFERRED EMBODIMENT

A description will be given of a first embodiment of a voltage control apparatus of an engine generator in accordance with the present invention with reference to the accompanying drawings.

Figure 1:
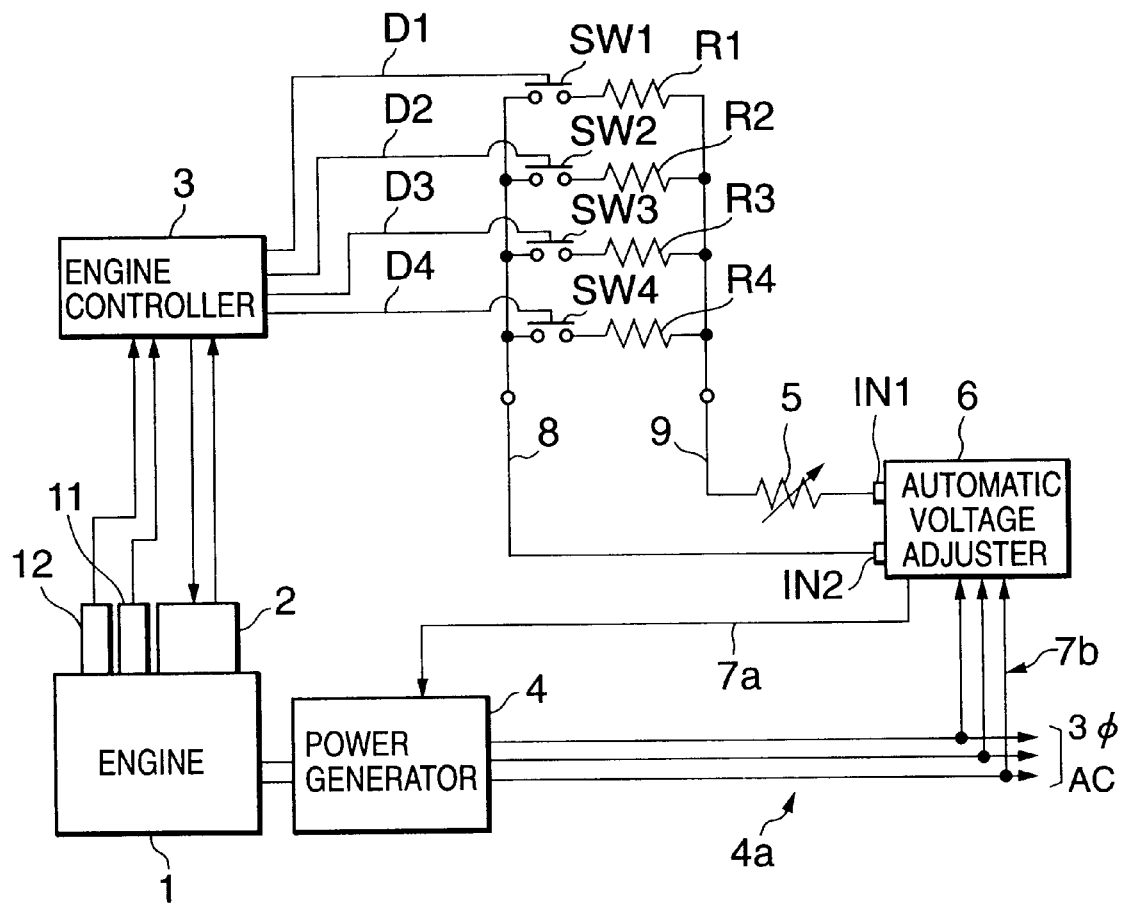
FIG. 1 is a schematic block diagram which shows a first embodiment of a voltage control apparatus of an engine generator in accordance with the present invention.

FIG. 1 is a schematic block diagram which shows a voltage control apparatus of an engine generator in accordance with the present embodiment. An electronic governor 2 and an engine controller 3 for controlling the electronic governor 2 are attached to an engine 1, and a power generator 4 is connected to an output shaft of the engine 1. The electronic governor 2 detects a difference between a target rotational speed and an actual rotational speed of the engine 1 and outputs a command for performing an injection amount control in correspondence to the difference to a position control apparatus (not shown) in a control rack of the engine 1 so as to control an injection amount. Wires D1, D2, D3 and D4 from the engine controller 3 are connected to an exciting coil in each of relays respectively having output contacts SW1, SW2, SW3 and SW4. The output contacts SW1, SW2, SW3 and SW4 are respectively connected to resistances R1, R2, R3 and R4 in series, one end side of each of the series circuits is connected to one adjustment voltage command input terminal IN2 of an automatic voltage adjuster 6 by a common wire 8, and another end side thereof is connected to another adjustment voltage command input terminal IN1 of the automatic voltage adjuster 6 via a variable resistance 5 by a common wire 9. In this case, the resistances R1, R2, R3 and R4 may be constituted by any of a stationary resistance and a variable resistance. Further, a wire 7a of the automatic voltage adjuster 6 is connected to an exciter (not shown) of the power generator 4 and an input line 7b is connected to a power output line 4a for a load of the power generator 4.

The automatic voltage adjuster 6 controls an exciting current value of the exciter in the power generator 4 so that an output voltage of the power generator 4 is set on the basis of an adjustment voltage command value corresponding to a magnitude of a value of the resistance connected between both adjustment voltage command input terminals IN1 and IN2. In this case, the variable resistance 5 is structured such as to finely adjust the set output voltage of the power generator 4.

Further, a rack sensor 11 for detecting a stroke of the control rack provided in the fuel injection pump is mounted to the engine 1 as means for detecting the fuel injection amount, and a pulse generator 12 for outputting a pulse having a frequency in proportional to the rotational speed is mounted thereto as means for detecting the engine rotational speed. The pulse generator 12 may be constituted, for example, by a pickup coil which detects a rotational magnetic field caused by a rotating magnet by a coil so as to generate a pulse voltage having a frequency in proportional to the rotational speed. A detected signal of the rack sensor 11 and a detected signal of the pulse generator 12 are respectively input to the engine controller 3.

The engine controller 3 is constituted by a calculating apparatus such as a computer, a high speed numerical calculating apparatus or the like. The engine controller 3 performs a predetermined process mentioned below on the basis of the engine rotational speed signal input from the engine speed detector (in this case, the pulse generator 12) and the fuel injection amount signal input from the fuel injection amount detector (in this case, the rack sensor 11), outputs on and off signals of the output contacts SW1, SW2, SW3 and SW4 so as to change a combined resistance of the resistances R1, R2, R3 and R4 in correspondence to the result of process, and controls the output voltage of the power generator 4 by the automatic voltage adjuster 6. In this case, since the number of resistance is four in the case of FIG. 1, a digital signal having four channels is output from the engine controller 3 as the on and off signals of the output contacts SW1, SW2, SW3 and SW4.

Figure 2:
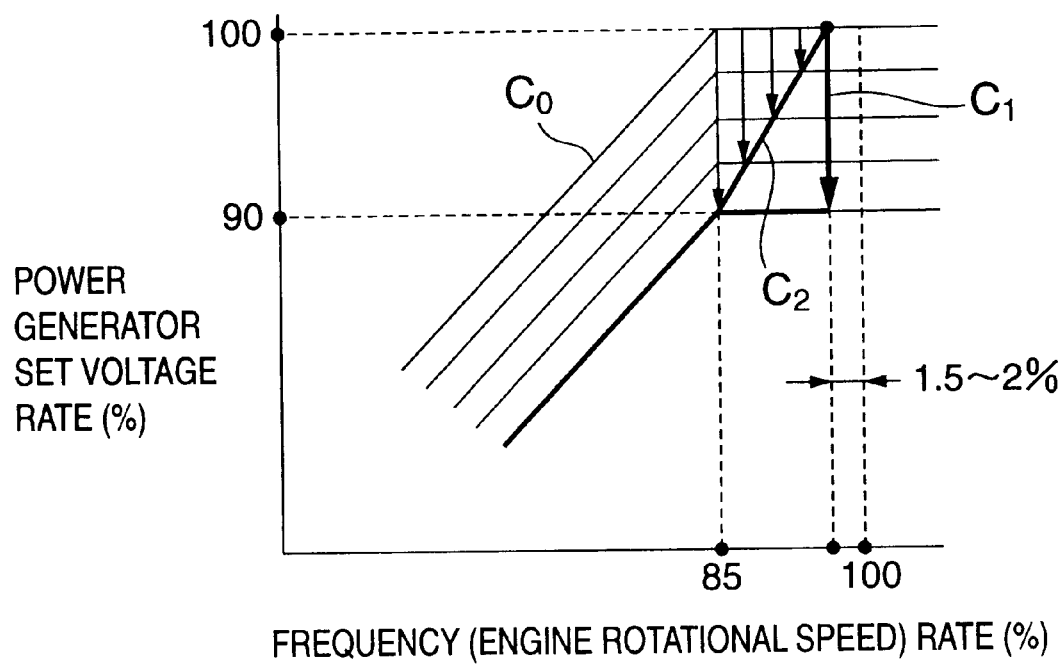
FIG. 2 is a graph which shows a relation between a set voltage rate and a frequency or engine rotational speed rate in the power generator.

FIG. 2 shows a relation between an input and output characteristic of the automatic voltage adjuster 6, that is, a rate of an output frequency of the power generator 4 (that is, the engine rotational speed) with respect to a rated value, and a rate of an output set voltage adjusted by the automatic voltage adjuster 6 at the frequency with respect to the rated output voltage.

The automatic voltage adjuster 6 controls the output voltage of the power generator 4 so that the frequency of the input voltage (the output voltage of the power generator 4) becomes substantially constant so as to be equal to the set voltage in spite of the load change until a predetermined frequency (85% the rated value in the present embodiment), and controls the output voltage of the power generator 4 substantially in proportional to the frequency when the frequency becomes smaller than the predetermined frequency. Accordingly, in a range equal to or more than the predetermined frequency (that is, the predetermined engine rotational speed), a constant voltage characteristic is obtained. By using the automatic voltage adjuster 6, for example, when the load of the engine 1 is increased and the engine rotational speed is 1.5–2% or more reduced with respect to the rated value, all of four output contacts SW1, SW2, SW3 and SW4 are simultaneously turned on, thereby suddenly reducing the set voltage in accordance with a path C1 shown in FIG. 2 so that the output set voltage is immediately reduced to a predetermined rate (for example, 90%) of the rated value. The set voltage is reduced due to the sudden reduction of the set voltage, however, the load of the power generator 4 with respect to the engine 1 is lightened, whereby the engine rotational speed is reduced at an only slight magnitude.

Further, by finely controlling a width and a timing of the set voltage reduction, for example, by controlling the set voltage along the curve C2 shown in FIG. 2 so as to gradually reduce the set voltage rate in proportional to a reduction amount of the engine rotational speed within a range between a point at which the engine rotational speed is 1.5–2% or more reduced with respect to the rated value and a point of 85% the rated value, it is possible to continuously lighten the engine load at a predetermined timing. It is possible to gradually reduce the set voltage rate at the predetermined timing by subsequently turning on four output contacts SW1, SW2, SW3 and SW4 in accordance with a predetermined output pattern.

In this case, in the case that the voltage adjustment is not performed even when the sudden load is applied to the power generator 4 as in the prior art, the output voltage of the power generator 4 is changed along a path C0 shown in FIG. 2 in accordance with the change of the engine rotational speed (the frequency), that is, the output voltage is adjusted to be substantially constant until the rated value of the engine rotational speed, for example, 85%, however, the output voltage is reduced in proportional to the reduction of the engine rotational speed at 85% or less.

A change of the set voltage of the power generator 4 can be achieved by changing the adjustment voltage applied between both voltage set input terminals IN1 and IN2 of the automatic voltage adjuster 6 as mentioned above.

Figure 3:
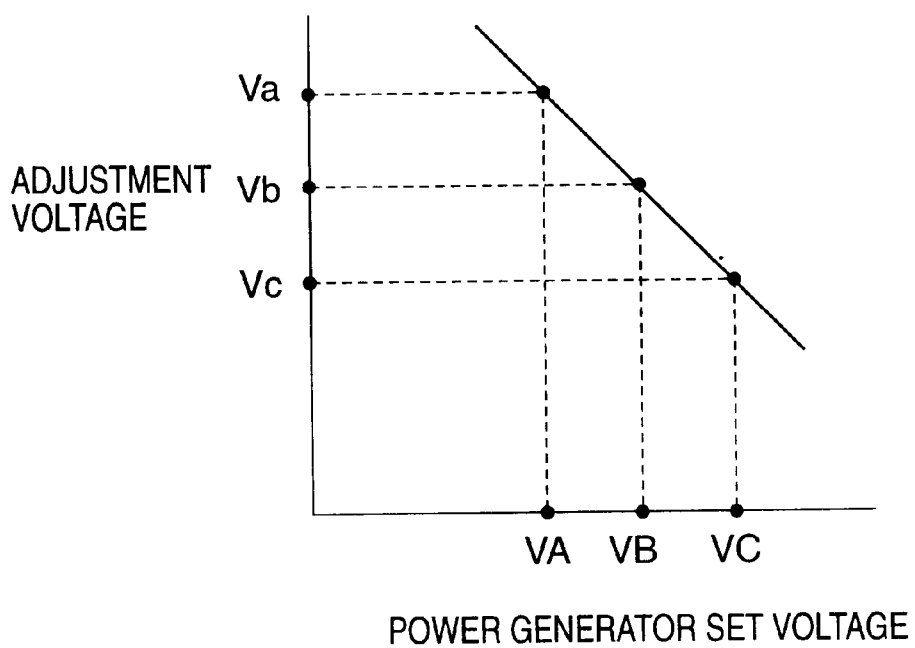
FIG. 3 is a graph which shows a relation between the set voltage of the power generator and an adjustment voltage.

FIG. 3 shows a relation between the adjustment voltage and the set voltage of the power generator. In the case that all of four output command signals to the output contacts SW1, SW2, SW3 and SW4 of the engine controller 3 shown in FIG. 1 are in a high level (hereinafter, expressed by a symbol H), all of the output contacts SW1, SW2, SW3 and SW4 are turned on and an adjustment voltage Va is input to the automatic voltage adjuster 6. The set voltage of the power generator 4 at this time is, for example, set to be a voltage VA in which the set voltage rate becomes 90% as shown in FIG. 2.

Further, in the case that all of four output command signals to the output contacts SW1, SW2, SW3 and SW4 of the engine controller 3 are in a low level (hereinafter, expressed by a symbol L), all of the output contacts SW1, SW2, SW3 and SW4 are turned off and an adjustment voltage Vc is input to the automatic voltage adjuster 6. The set voltage of the power generator 4 at this time is, for example, set to be a voltage VC in which the set voltage rate becomes 100% as shown in FIG. 2. In this case, the rated voltage VC is set to 200 V or 400 V in the case of 50 Hz and set to 220 V or 440 V in the case of 60 Hz. An adjustment voltage Vb disposed between the adjustment voltages Va and Vc corresponds to any one of combined patterns (16 patterns of 4 bits in the present embodiment) of on and off in the output contacts SW1, SW2, SW3 and SW4. With respect to the range between the adjustment voltages Va and Vc, a substantially linear relation is achieved between the set voltages VA and VC of the power generator 4, and the adjustment voltage Vb corresponds to the set voltage VB.

The engine 1 is controlled in such a manner as to always drive the power generator 4 within a predetermined rotational speed range. Accordingly, in accordance with the present embodiment, the output voltage of the power generator 4 is controlled on the basis of the engine rotational speed and/or the fuel injection amount.

Figure 4:
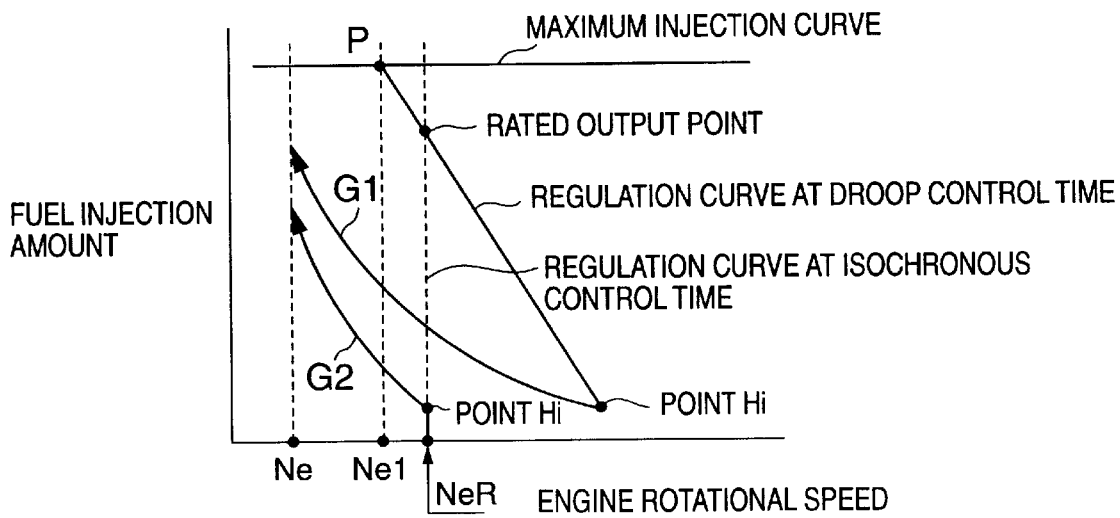
FIG. 4 is a graph which shows a relation between an engine rotational speed and a fuel injection amount in the case of controlling an output voltage of the engine generator on the basis of the engine rotational speed.

FIG. 4 is a graph which shows a relation between the engine rotational speed and the fuel injection amount in the case of controlling the output voltage of the power generator 4 on the basis of the engine rotational speed. The engine controller 3 is structured such as to start controlling the output voltage (the set voltage) of the power generator 4 by the automatic voltage adjuster 6 when the engine rotational speed is reduced to a level lower than a predetermined control starting engine rotational speed Ne1, and the control starting engine rotational speed Ne1 is previously set in the engine controller 3. The engine controller 3 inputs a rotational speed actually measured value Ne from the engine rotational speed detector, calculates a deviation value $\alpha 1$ between the control starting engine rotational speed Ne1 and the rotational speed actually measured value Ne, and controls the output voltage of the power generator 4 on the basis of the deviation value $\alpha 1$ so as to reduce the engine load.

In the present embodiment, the control starting engine rotational speed Ne1 is set to a crossing point between a regulation curve (a curve moving in accordance with maximum output points with respect to respective rotational speeds) and a maximum injection amount curve (a constant curve at the maximum injection amount) or an engine rotational speed obtained by adding room with respect to a rotational number statically determination (a hunting), in the case that the engine rotational speed is changed by the output value (that is, the fuel injection amount), so-called a droop control. The control starting engine rotational speed Ne1 is normally about 20–30 rpm lower than a rated rotational speed NeR.

On the contrary, in the case of a so-called isochronous control in which the engine rotational speed is substantially constant (the rated rotational speed NeR) without relation to the output value, the control starting engine rotational speed Ne1 is normally set to be 20–30 rpm lower than the rated rotational speed NeR by adding the allowance with respect to the rotational speed statically determination (the hunting) in the same manner as that of the droop control.

In the case of a gentle load in which the load applied to the power generator 4 at the droop control time is slowly increased, the engine rotational speed and the fuel injection amount moves near the rated rotational speed NeR along the regulation curve at the droop control time from a high idle rotational speed (hereinafter, refer to as a point Hi).

However, in the case of the sudden load, a locus of the fuel injection amount with respect to the engine rotational speed moves along a curve G1 from the point Hi, and the reduction of the rotational speed is greater than the increase of the fuel injection amount. Further, in the case of the isochronous control, the locus of the fuel injection amount with respect to the engine rotational speed moves along a curve G2 from the point Hi on the regulation curve at the isochronous control time.

When the engine rotational speed is reduced to a level equal to or less than the control starting engine rotational speed Ne1 due to the sudden load with respect to the power generator 4, the output voltage control by the automatic voltage adjuster 6 is started, however, at this time, the engine controller 4 changes the output on and off patterns of the output contacts SW1, SW2, SW3 and SW4 in correspondence to a magnitude of a deviation value α1 between the control starting engine rotational speed Ne1 and the actually measured value Ne. For example, 16 on and off patterns of the output contacts SW1, SW2, SW3 and SW4 with respect to four resistances R1, R2, R3 and R4 shown in FIG. 1 are respectively output in correspondence to the magnitude of the deviation value α1 as shown in Table 1.

In Table 1, reference symbol H denotes an on operation of the output contacts SW1, SW2, SW3 and SW4 and reference symbol L denotes an off operation thereof.

Figure 5:
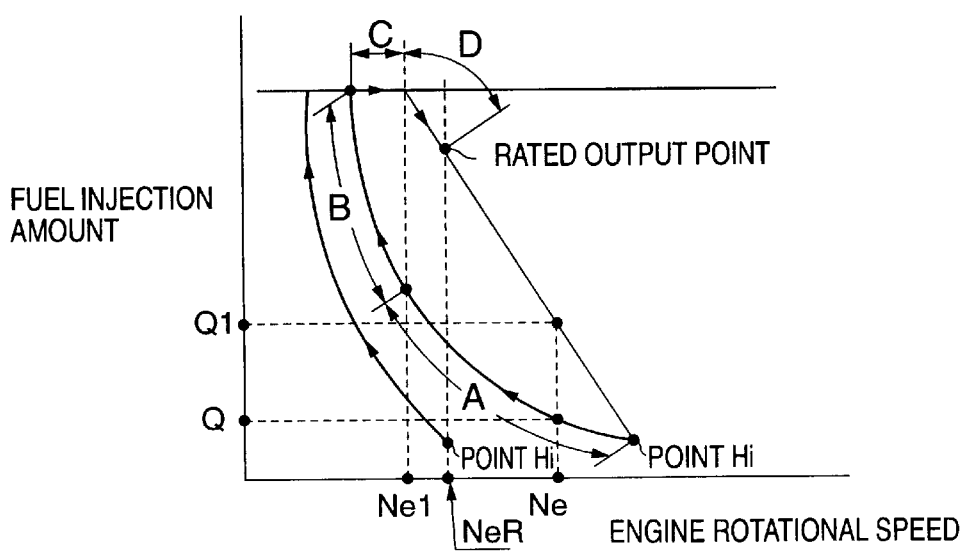
FIG. 5 is a graph which shows a relation between an engine rotational speed and a fuel injection amount in the case of controlling an output voltage of the engine generator on the basis of the engine rotational speed and the fuel injection amount.

Next, a description will be given of a control on the basis of a deviation value α2 of the fuel injection amount. A control command in the present embodiment is calculated on the basis of a rate β of the deviation value α2 between a target value Q1 of the fuel injection amount on the regulation curve corresponding to the engine rotational speed Ne at a control time and an actually measured value Q of the fuel injection amount at that time with respect to a target value, as shown in FIG. 5. In this case, the rate β can be calculated in accordance with the following formula.

$$\beta = (\text{target value Q1 of fuel injection amount} - \text{actually measured value Q})/\text{target value Q1} = \text{deviation value } \alpha2/\text{target value Q1}$$

Table 2 shows an example of an output pattern in the case of respectively turning on and off the output contacts SW1, SW2, SW3 and SW4 on the basis of the rate β. When the rate β is less than 0.10, the adjustment voltage of the automatic voltage adjuster 6 is not changed, and when the rate β becomes equal to or more than 0.10, the adjustment voltage is changed in correspondence to the rate β and the set voltage of the power generator 4 is reduced.

TABLE 1

| α | 300 OR MORE | 280 OR MORE | 260 OR MORE | 240 OR MORE | 220 OR MORE | 200 OR MORE | 180 OR MORE | 160 OR MORE |
|---|---|---|---|---|---|---|---|---|
| OUTPUT 1 | H | H | H | H | H | H | H | H |
| OUTPUT 2 | H | H | H | H | L | L | L | L |
| OUTPUT 3 | H | H | L | L | H | H | L | L |
| OUTPUT 4 | H | L | H | L | H | L | H | L |

| α | 140 OR MORE | 120 OR MORE | 100 OR MORE | 80 OR MORE | 60 OR MORE | 40 OR MORE | 20 OR MORE | LESS THAN 20 |
|---|---|---|---|---|---|---|---|---|
| OUTPUT 1 | L | L | L | L | L | L | L | L |
| OUTPUT 2 | H | H | H | H | L | L | L | L |
| OUTPUT 3 | H | H | L | L | H | H | L | L |
| OUTPUT 4 | H | L | H | L | H | L | H | L |

TABLE 2

| β | 1 OR MORE | 0.95 OR MORE | 0.90 OR MORE | 0.85 OR MORE | 0.80 OR MORE | 0.75 OR MORE | 0.70 OR MORE | 0.65 OR MORE |
|---|---|---|---|---|---|---|---|---|
| OUTPUT 1 | H | H | H | H | H | H | H | H |
| OUTPUT 2 | H | H | H | H | L | L | L | L |
| OUTPUT 3 | H | H | L | L | H | H | L | L |
| OUTPUT 4 | H | L | H | L | H | L | H | L |

| β | 0.60 OR MORE | 0.55 OR MORE | 0.50 OR MORE | 0.40 OR MORE | 0.30 OR MORE | 0.20 OR MORE | 0.10 OR MORE | LESS THAN 0.10 |
|---|---|---|---|---|---|---|---|---|
| OUTPUT 1 | L | L | L | L | L | L | L | L |

TABLE 2-continued

| OUTPUT 2 | H | H | H | H | L | L | L | L |
|---|---|---|---|---|---|---|---|---|
| OUTPUT 3 | H | H | L | L | H | H | L | L |
| OUTPUT 4 | H | L | H | L | H | L | H | L |

When performing the output voltage control of the power generator 4 by the automatic voltage adjuster 6 on the basis of the change of the engine rotational speed, in the case of the isochronous control, the control starting engine rotational speed Ne1 is set to be 20–30 rpm lower than the rated rotational speed NeR and a difference between the control starting engine rotational speed Ne1 and the rated rotational speed NeR is small, so that it is possible to start the control by the automatic voltage adjuster 6 immediately after the load is suddenly input.

On the contrary, in the case of the droop control, an actually used rotational speed range is wide. For example, in the case that the frequency is 50 Hz, there is a width of about 100 rpm when including an overload. That is, the point Hi at the droop control time shown in FIG. 4 is 75 rpm higher than the rated rotational speed NeR in the 50 Hz power generator (NeR=1500 rpm) if the droop rate is 5%, and is 90 rpm higher in the 60 Hz power generator (NeR=1800 rpm). At this time, since the difference of the rotational speed between a high idle with no load and the control starting engine rotational speed Ne1 becomes 95–110 rpm in the case of setting the control starting engine rotational speed Ne1 to be about 20 rpm lower than the rated rotational speed NeR, it is impossible to start the load control of the power generator 4 in accordance with a control of the set voltage of the automatic voltage adjuster 6 until the engine rotational speed is reduced to a level lower than the control starting engine rotational speed Ne1 (a range A in FIG. 5) after the sudden load is input to the power generator 4.

Further, in the case of the control performed only by the fuel injection amount, there is no problem in the ranges A and B in FIG. 5. However, in the ranges C and D in FIG. 5 where the target value Q1 and the actually measured value Q of the fuel injection amount coincide with each other, although the rotational speed is widely reduced, it is impossible to perform the load control of the power generator 4 in accordance with the control of the set voltage of the automatic voltage adjuster 6.

As mentioned above, it is preferable to judge the state in the ranges A to D in FIG. 5 on the basis of both of the engine rotational speed and the fuel injection amount so as to control.

Next, a description will be given of a first embodiment of a method of controlling the voltage of the engine generator in accordance with the present invention.

Figure 6:
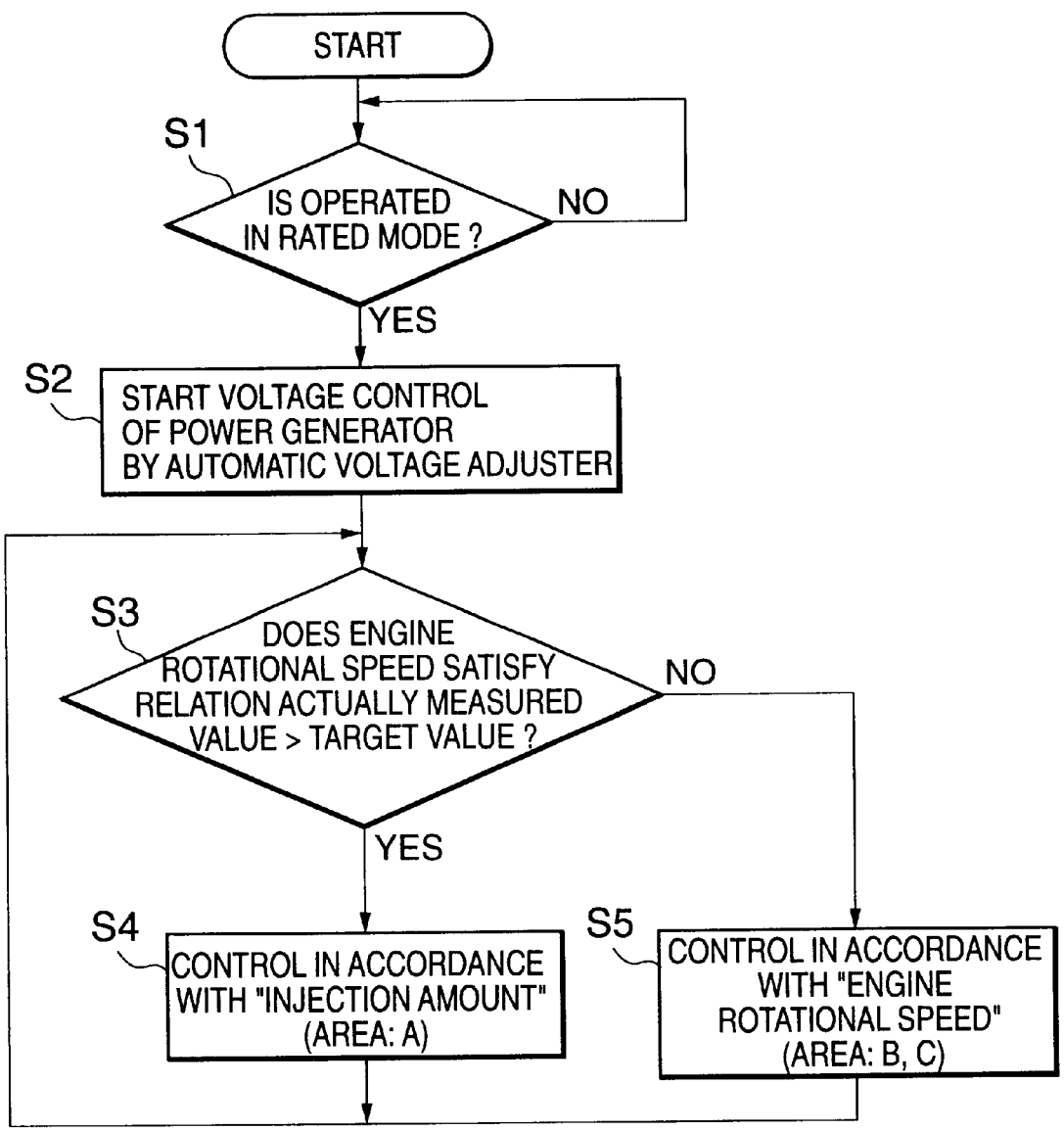
FIG. 6 is a flow chart which shows a first embodiment of a method of controlling a voltage of the engine generator in accordance with the present invention.

FIG. 6 is a flow chart which shows a control procedure of the engine controller 3 in accordance with the present embodiment. In FIG. 6, number of each of steps is expressed by attaching a symbol S thereto.

At first, after confirming that the engine 1 is operated in the rated mode in a step S1, the output voltage control of the power generator 4 in accordance with the control of the set voltage of the automatic voltage adjuster 6 is started from a step S2. Then, in a step S3, the rotational speed is input from the engine rotational speed detector and it is checked whether or not the actually measured value Ne of the input engine rotational speed is larger than the control starting engine rotational speed Ne1 (described as the target value in FIG. 6). When it is larger, in a step S4, the control of the output voltage is performed on the basis of the rate of the deviation value α2 of the fuel injection amount with respect to the target value Q1. A subject to be controlled at this time is a range of the area A in FIG. 5. Thereafter, the step goes back to the step S3 and the processes mentioned above are repeated. Further, when the actually measured value Ne is equal to or less than the control starting engine rotational speed Ne1 in the step S3, in a step S5, the control of the output voltage is performed on the basis of the deviation value α1 of the engine rotational speed. A subject to be controlled at this time is a range of the areas B and C in FIG. 5. Thereafter, the step goes back to the step S3 and the processes mentioned above are repeated.

Figure 7:
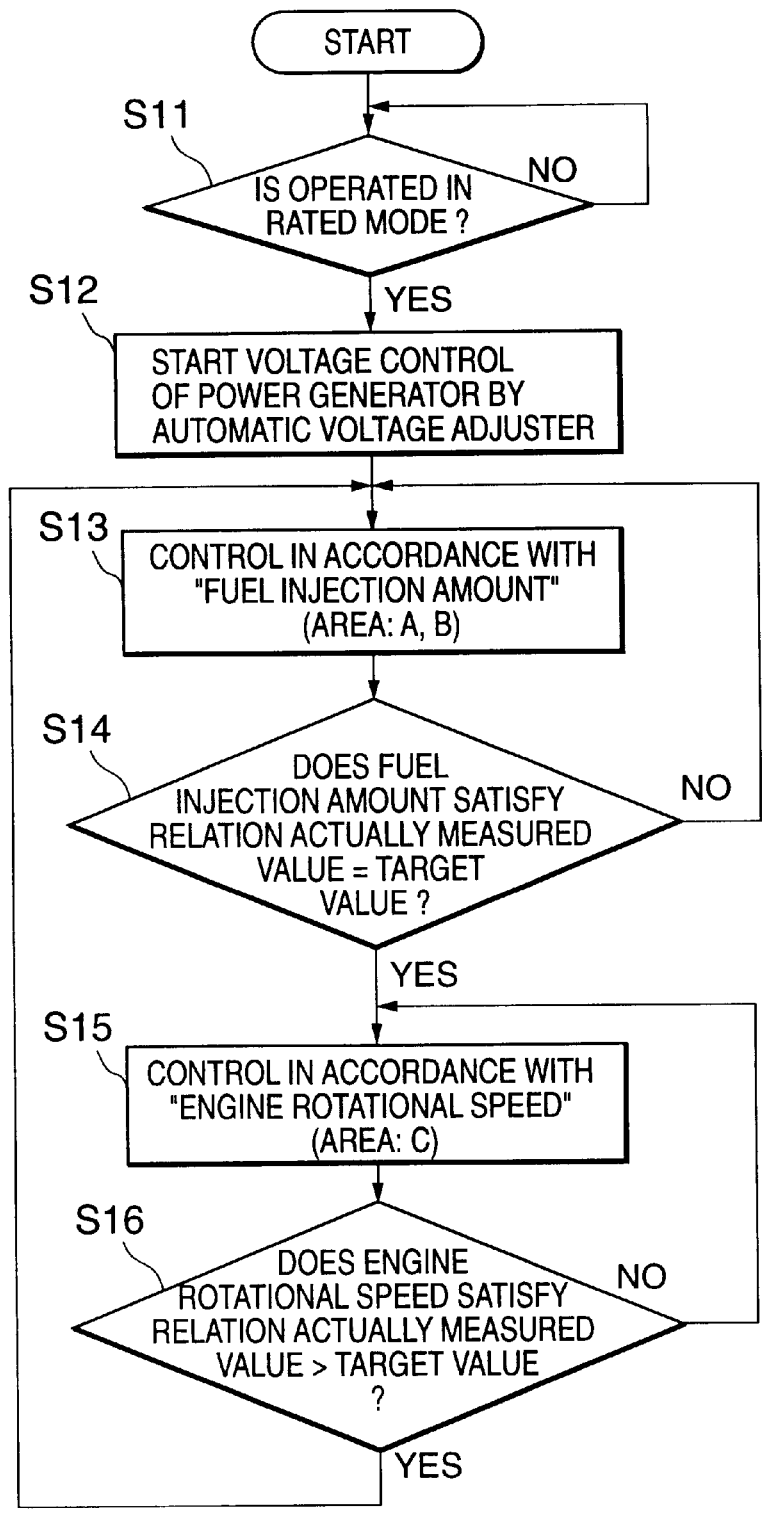
FIG. 7 is a flow chart which shows a second embodiment of a method of controlling a voltage of the engine generator in accordance with the present invention.

FIG. 7 is a flow chart which shows a second embodiment of a method of controlling the voltage of the engine generator in accordance with the present embodiment.

After confirming that the engine 1 is operated in the rated mode in a step S11, the output voltage control of the power generator 4 in accordance with the control of the set voltage of the automatic voltage adjuster 6 is started from a step S12. Next, in a step S13, the output voltage of the power generator 4 is controlled on the basis of the rate β of the deviation value α2 of the fuel injection amount with respect to the target value Q1, and a subject to be controlled at this time is a range of the areas A and B in FIG. 5. Thereafter, the step goes to a step S14, and it is checked whether or not the actually measured value Q of the fuel injection amount is equal to the target value Q1 of the fuel injection amount (described as a target value in FIG. 7) and in the case that the actually measured value Q is different from the target value Q1, the step goes back to the step S13 and the processes are repeated. In the case that they are equal to each other in the step S14, the control is switched in a step S15 to the control in accordance with the deviation value α1 of the engine rotational speed. A relation that that actually measured value Q equals to the target value Q1 is achieved in the range C in FIG. 5. Next, in a step S16, the actually measured value Ne of the engine rotational speed is compared with the target value Ne1, and in the case that the actually measured value Ne is larger than the target value Ne1, the step goes back to the step S13 and the processes are repeated. Further, in the case that the actually measured value Ne is equal to or less than the target value Ne1, the step goes back to the step S15 and the processes are repeated.

In accordance with the first and second embodiments mentioned above, since the magnitude of the load of the power generator 4 is judged on the basis of the rotational speed of the engine and the fuel injection amount and the output voltage of the power generator 4 is controlled in correspondence to the deviation value α1 of the rotational speed and/or the deviation value α2 of the fuel injection amount, the output voltage is reduced at a time of increasing the load of the power generator 4 so as to reduce the load, and the restoration of the rotational speed is quickened. Accordingly, since the change width of the changing time of the output voltage, the frequency and the like in the power generator 4 are restricted to a minimum limit at the sudden load transient time, it is possible to move to a stable operation for a short time.

Further, in the voltage control method of descending the output voltage of the power generator 4 at a time when the load detected in accordance with the output current, the output power or the like in the power generator 4 side is increased as in the prior art, thereby reducing the load, it is necessary to provide a current sensor and a power detecting sensor. However, in the first and second embodiments, it is possible to detect the load of the power generator by utilizing the rotational speed detector of the electronic governor provided for controlling the engine rotational speed and the fuel injection amount detecting means. Accordingly, it is possible to manufacture the voltage control apparatus of the engine generator at a low cost.

Further, by detecting the load increase amount in accordance with the deviation value $\alpha 2$ between the target value Q1 and the actually measured value Q of the fuel injection amount with respect to the actually measured value Ne of the engine rotational speed and controlling the output voltage of the power generator 4 in correspondence to the load increase amount, even when the engine rotational speed is not reduced to the predetermined target value (the control starting engine rotational speed Ne1) and the control of the output voltage performed in correspondence to the deviation value $\alpha 1$ of the rotational speed can not be performed, it is possible to early know the load increase so as to immediately reduce the load. Accordingly, it is possible to control the sudden load transient characteristic of the power generator 4 with an improved response.

In addition, in the case that the deviation value $\alpha 2$ becomes 0 (Q1=Q) while controlling the output voltage of the power generator 4 in correspondence to the deviation value $\alpha 2$ between the target value Q1 and the actually measured value Q of the fuel injection amount, the load of the power generator 4 is reduced in correspondence to the deviation value $\alpha 1$ of the rotational speed. Accordingly, by securely controlling the rotational speed to a level equal to or more than the predetermined target value for a short time, it is possible to restrict the change width and the changing time of the output voltage, the frequency and the like of the power generator 4 at the sudden load transient time to a minimum limit and it is possible to accurately move to the stable operation.

Figure 8:
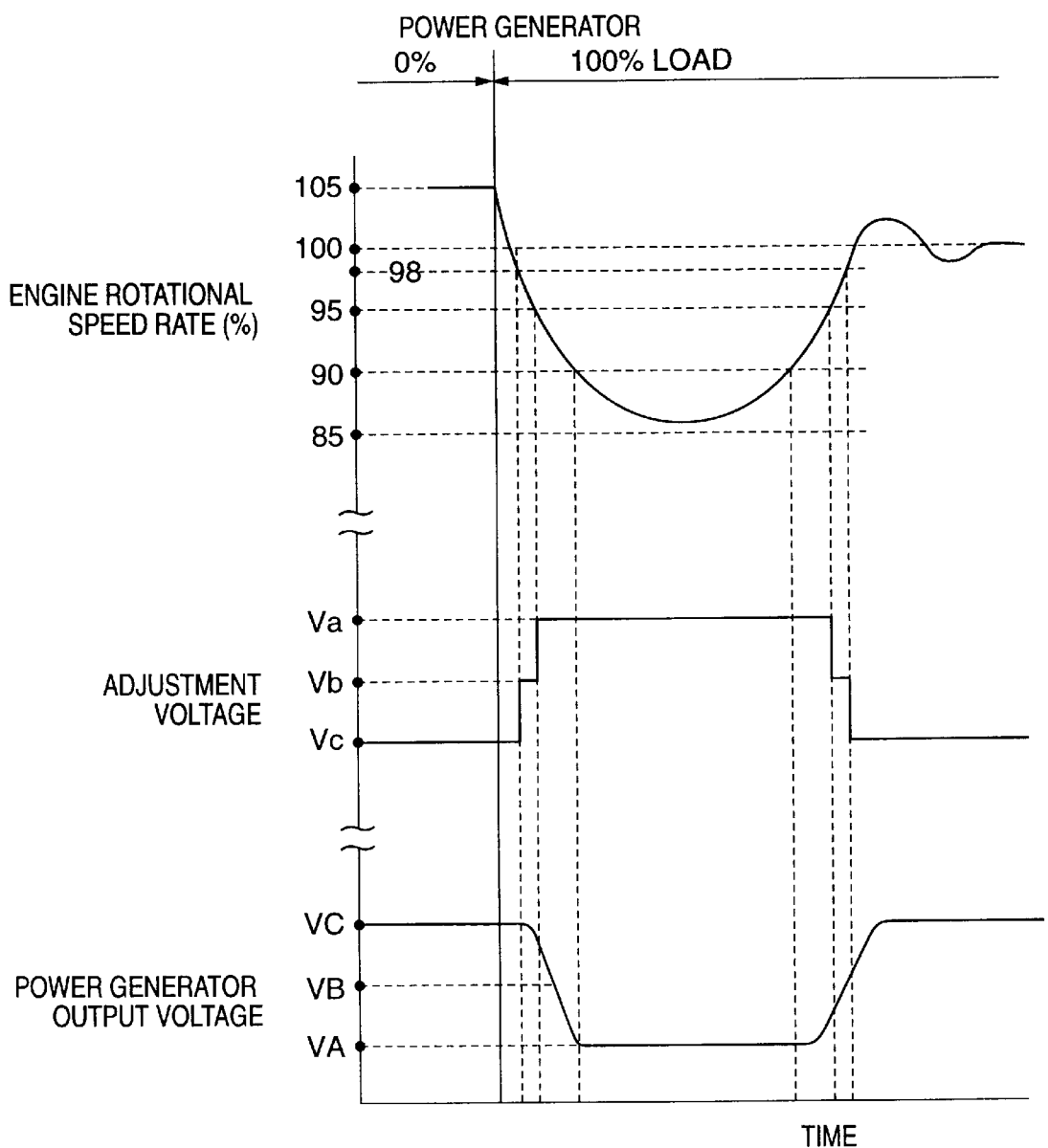
FIG. 8 is a graph which shows a relation between a change of the engine rotational speed rate, and the adjustment voltage and the power generator output voltage.

Next, a description will be given of a third embodiment of a voltage control method of an engine generator in accordance with the present invention. As shown in FIG. 8, it is supposed that the load of the power generator 4 is suddenly increased from 0% to 100%, and the rate of the engine rotational speed with respect to the rated rotational speed NeR is reduced to a predetermined rotational speed which is a little larger than 85% and is thereafter gradually restored. It is structured such that the command of the adjustment voltage is intermittently output from the automatic voltage adjuster 6 to the power generator 4 at a predetermined times (in this case, two times), during this time. This is because of the following reasons.

(1) The engine rotational speed is not immediately restored by a first command of the adjustment voltage (a first output of adjustment voltages Vb and Va in FIG. 8), and a certain degree of time is required for the rate of the engine rotational speed to be restored to 100%.

(2) Since the power generator 4 has a functional restriction while the output voltage of the power generator 4 is reduced to the rated voltage VC, it is necessary to restore the output voltage to the rated voltage VC for canceling this.

For this purpose, the engine controller 3 is structured such as to output the command of the adjustment voltage for a predetermined time, thereafter return the adjustment voltage to the original adjustment voltage Vc corresponding to the rated voltage VC, and again output the command of the adjustment voltage in correspondence to the rate β of the deviation value $\alpha 1$ of the engine rotational speed at this time or the deviation value $\alpha 2$ of the fuel injection amount with respect to the target value Q1 after a predetermined time has passed from a time when the output voltage of the power generator 4 returns to the rated voltage VC. In an embodiment shown in FIG. 8, the adjustment voltages Va and Vb at a second time are output to the automatic voltage adjuster 6 in the middle of increasing of the engine rotational speed rate after being restored.

As mentioned above, the output voltage of the power generator 4 is reduced as shown in FIG. 8 during a period that the engine rotational speed is reduced so as to be restored to the rated rotational speed NeR. However, it is not preferable to reduce the output voltage of the power generator 4 when the engine rotational speed rate is in the middle of restoration. In order to solve the problem, in accordance with the present embodiment, four thresholds are provided for judging the engine rotational speed and two thresholds are provided for judging the control time.

Figure 9:
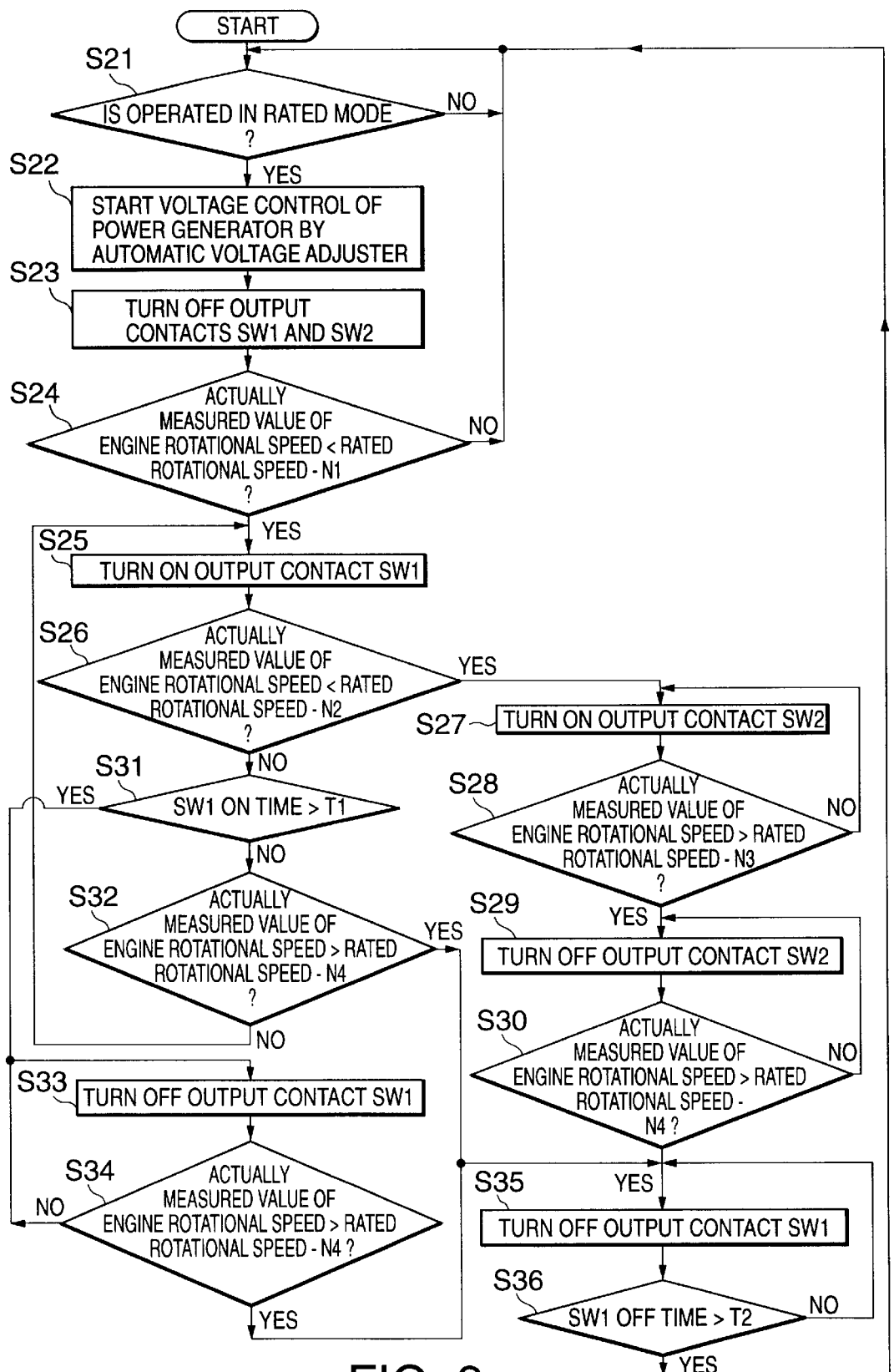
FIG. 9 is a flow chart which shows a third embodiment of a method of controlling a voltage of the engine generator in accordance with the present invention.

FIG. 9 shows a flow chart of executing the control of the output voltage of the power generator 4 with providing four thresholds with respect to the engine rotational speed. In this case, as first to fourth thresholds of the engine rotational speed, for example, N1=30 rpm, N2=100 rpm, N3=50 rpm and N=20 rpm are set. In this case, a relation N2>N1>N4 and N2>N3>N4 is set. Further, as first and second thresholds of the control time, for example, T1=1.5 sec and T2=6 sec are set. In this case, a relation T1<T2 is set. Further, only two output contacts SW1 and SW2 are employed for setting the adjustment voltage of the automatic voltage adjuster 6. Accordingly, the other output contacts SW3 and SW4 are always set to be off or are not mounted.

Steps S21 and S22 are the same as the steps S1 and S2 in the flow chart in FIG. 6 mentioned above. Next, in a step S23, the output contacts SW1 and SW2 are turned off and the adjustment voltage of the automatic voltage adjuster 6 is set to correspond to the rated voltage. Then, in a step S24, it is checked whether or not the actually measured value Ne of the engine rotational speed is smaller than a value (a first target value Ne1) obtained by the formula rated rotational speed NeR–N1, and when the relation is not established (that is, the value Ne is equal to or more than the target value), the step goes back to the step S21 and the process is repeated from the beginning. When it is smaller, the step goes to a step S25 and the output contact SW1 is turned on. In this case, the output contact SW1 is turned on so that the output voltage of the power generator 4 becomes a predetermined value, for example, within a range between 100% and 90%.

Next, the step goes to a step S26 and it is checked whether or not the actually measured value Ne of the engine rotational speed is smaller than a value (a second target value Ne2) obtained by the formula rated rotational speed NeR–N2. When it is smaller, it is supposed that a lot of time is required for the engine rotational speed to be restored to a normal value and the step goes to a step S27 and the output contact SW2 is turned on. Then, the step goes to a step S28 and it is checked whether or not the actually measured value Ne of the engine rotational speed is equal to or more than a value obtained by the formula rated rotational speed–N3. When it is not equal to or more than the value, the step goes back to a step S27 and waits until it becomes equal to or more than the value. When it is equal to or more than the value, in a step S29, the output contact SW2 is turned off. Then, in a step S30, it is checked whether or not the actually measured value Ne of the engine rotational speed is equal to or more than a value obtained by the formula rated rotational speed−N4. When it is not equal to or more than the value, the step goes back to the step S29 and waits until it becomes equal to or more than the value. When it becomes equal to or more than the value, the step goes to a step S35. In the step S35, the output contact SW1 is turned off, thereafter waits in a step S36 until an off continuing time of the output contact SW1 becomes larger than a predetermined second threshold T2, returns to the step S21 after it becomes larger than the second threshold T2, and the present control process is repeated from the beginning.

Further, in the step S26, when the actually measured value Ne of the engine rotational speed is equal to or more than a value obtained by the formula rated rotational speed NeR−N2, in a step S31, it is checked whether or not an on continuing time of the output contact SW1 is larger than the predetermined first threshold T1. When it is larger than the value, in a step S33, the output contact SW1 is turned off, and next in a step S34, the step waits until the actually measured value Ne of the engine rotational speed becomes larger than a value obtained by the formula rated rotational speed NeR−N4. When it becomes larger than the value, the step goes to the step S35 and the processes after the step S36 are repeated.

In the step S31, when the on continuing time of the output contact SW1 is equal to or less than the predetermined first threshold T1, in the step S32, it is checked whether or not the actually measured value Ne of the engine rotational speed is larger than a value obtained by the formula rated rotational speed−N4. When it is larger than the value, the step goes to the step S35 and the processes after the step S36 are repeated. When it is smaller than the value in the step S32, the step goes back to the step S25 and the processes mentioned above are repeated.

Figure 10:
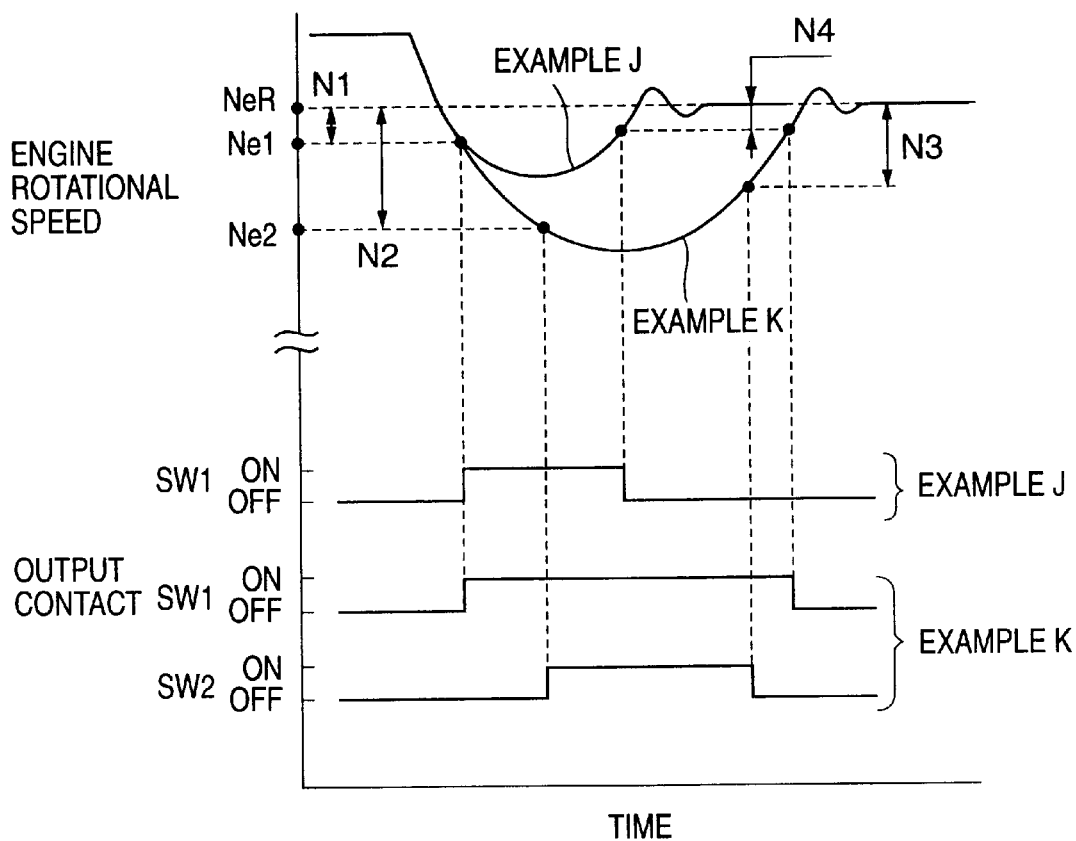
FIG. 10 is a graph which shows a relation between a change of the engine rotational speed and an operation of an output contact in the third embodiment shown in FIG. 9.

In this case, the first to fourth thresholds N1, N2, N3 and N4 of the engine rotational speed explained in the flow chart in FIG. 9, and a relation between the first and second thresholds T1 and T2 of the continuing time and a voltage change of the power generator 4 can be expressed as in FIG. 10.

In an example J shown in FIG. 10, the engine rotational speed descends from the rated rotational speed NeR at a degree equal to or more than the first threshold N1 and equal to or less than the second threshold N2 (that is, 30 to 100 rpm with respect to the rated rotational speed NeR), and the output of the output contact SW1 at this time becomes on. Thereafter, when the engine rotational speed is restored and returned to a value equal to or more than "rated rotational speed NeR−N4", the output contact SW1 is turned off.

On the contrary, in an example K, since the engine rotational speed descends from the rated rotational speed NeR at a degree equal to or more than the second threshold N2 (that is, 100 rpm), it is judged that a lot of time is required for restoration, and the output contact SW2 is turned on in addition to the output contact SW1.

Thereafter, when the engine rotational speed is restored to "rated rotational speed NeR−N3", the output contact SW2 is at first turned off, and when it is further restored to a level equal to or more than "rated rotational speed NeR−N4", the output contact SW1 is turned off. Accordingly, the reduction time of the output voltage of the power generator 4 is restricted to a level equal to or less than a predetermined limit.

Further, in accordance with the flow chart in FIG. 9, in the case that the reduced engine rotational speed is equal to or more than "rated rotational speed NeR−N2", when the on continuing time of the output contact SW1 is over the first threshold T1, the output contact SW1 is turned off without waiting the restoration of the engine rotational speed to a level equal to or more than "rated rotational speed NeR−N4", and the control of reducing the output voltage of the power generator 4 is not performed. Accordingly, since a state in which the output voltage is lower than the rated voltage is within a predetermined time, it is possible to control the output voltage reduction time of the power generator 4 in accordance with a standard manner, and it is also possible to restrict the change of the output voltage.

Further, during the time when the control mentioned above is performed at one time and the control continuing time after returning the output voltage of the power generator 4 to the rated voltage is within the second threshold T2, the control mentioned above is not repeated. That is, the output voltage is kept being set to the rated voltage. That is, since the structure is made such as to wait the restoration of the engine rotational speed with keeping the rated voltage at the rotational speed reduction time immediately after returning to the rated voltage, the output voltage is not frequently changed in accordance with the present control. Accordingly, the output voltage of the power generator 4 becomes stable. There is no risk that the reduction of the engine rotational speed is reduced when returning the output voltage to the rated voltage and the output voltage control is again started which is performed in the prior art.

Figure 11:
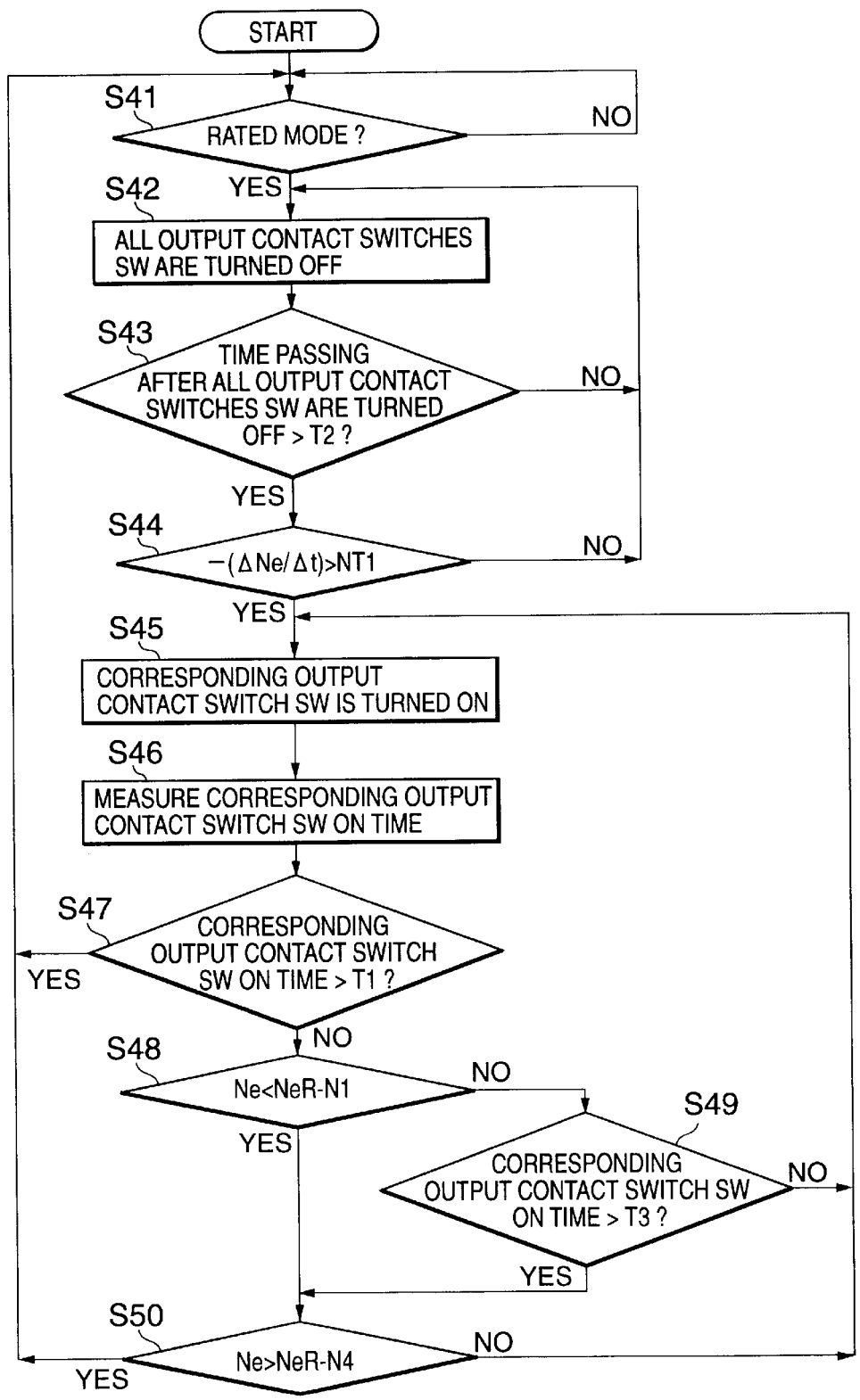
FIG. 11 is a flow chart which shows a fourth embodiment of a method of controlling a voltage of the engine generator in accordance with the present invention.

Next, a description will be given of a fourth embodiment of a method of controlling a voltage of an engine generator in accordance with the present invention with reference to FIG. 11. In this case, a structure of a control circuit is the same as the circuit shown in FIG. 1. Further, in the same manner as the third embodiment, for example, N1=30 rpm and N4=20 rpm (in this case, N1>N4) are previously set as first and fourth thresholds of the engine rotational speed, respectively, and for example, T1=1.5 sec, T2=6 sec and T3=0.5 sec (in this case, T3<T1<T2) are previously set as first, second and third thresholds of the control time (that is, continuing time that a corresponding output contact switch SW is in an on state), respectively.

At first, after confirming that the engine 1 is operated in the rated mode in a step S41, all the output contact switches SW are turned off in a step S42, and an adjusting voltage of the automatic voltage adjuster 6 is set to correspond to the rated voltage. It is checked in a step S43 whether or not the time passing after all the output contact switches SW are turned off is greater than the second threshold T2, the step goes back to the step S42 until the passing time becomes greater than the second threshold T2 and this operation is repeated, and when it becomes greater, the step goes to a step S44. In the step 44, a change rate of the actual engine rotational speed Ne with respect to the time ($\Delta$Ne/$\Delta$t) is calculated and determined, it is checked whether or not the change rate is greater than a predetermined value NT1 (positive number), that is, whether or not the relation−($\Delta$Ne/$\Delta$t)>NT1 is established, and when it is not greater, the step goes back to the step S42 and the process mentioned above is repeated. When it is greater, the step goes to a step S45 and the corresponding output contact switch SW is turned on in accordance with a magnitude of the change rate−($\Delta$Ne/$\Delta$t).

Next, the on time of the corresponding output contact switch SW is measured in a step S46, it is checked in a step S47 whether or not the on time of the corresponding output contact switch SW is greater than the first threshold T1, and when it is greater than the value, the step goes back to the step S41 and the process mentioned above is repeated. When it is equal to or less than the first threshold T1, the step goes to a step S48 and it is checked whether or not the actual engine rotational speed Ne is smaller than a predetermined first target value (the rated rotational speed NeR−N1). When it is smaller than the value, the step goes to a step S50 and it is checked whether or not the actual engine rotational speed Ne becomes greater than a predetermined fourth target value (the rated rotational speed NeR−N4). When it becomes greater than the value, the step goes back to the step S41 and the process mentioned above is repeated, and when it is equal to or less than the value, the step goes back to the step S45, the corresponding output contact switch SW continues to be in an on state and the process mentioned above is repeated.

Further, when the actual engine rotational speed Ne is equal to or more than the predetermined first target value (NeR−N1) in the step S48, the step goes to a step S49 and it is checked whether or not the on time of the corresponding output contact switch SW becomes greater than the third threshold T3. When it becomes greater than the value, the step goes to the step S50, and when it is equal to or less than the value, the step goes back to the step S45 and the process mentioned above is repeated.

In accordance with the present embodiment, when the change rate of the actual engine rotational speed Ne with respect to the time−(ΔNe/Δt) becomes greater than the predetermined value NT1, it is judged that the load is applied since the reduction of the actual engine rotational speed is sudden, and the corresponding output contact switch SW is turned on in accordance with the magnitude of the change rate−(ΔNe/Δt) at this time (S45). At this time, the output patterns of all the output contact switches SW are previously determined in the same manner as Tables 1 and 2 mentioned above so that the output voltage target value of the power generator 4 is set in accordance with the magnitude of the change rate−(ΔNe/Δt), that is, in accordance with the degree of the engine load, whereby the adjusting voltage of the automatic voltage adjuster 6 is set. For example, when the change rate−(ΔNe/Δt) is great, the output voltage target value of the power generator 4 is set to be low. As mentioned above, since the output voltage can be set to be optimum in accordance with the load, it is possible to stably restore the actual engine rotational speed Ne for a short time without reference to the degree of the load.

In this case, in the output voltage control in accordance with the deviation value of the injection amount in the embodiment mentioned above, since the deviation value of the injection amount is at first calculated on the basis of the result of the reduction of the actual engine rotational speed Ne and the output voltage target value, that is, the adjust voltage of the automatic voltage adjuster 6 is successively calculated, the change rate of the actual engine rotational speed becomes an earlier information than the deviation value of the injection amount. In accordance with the present embodiment, since the output voltage control of the power generator 4 can be early started even when the sudden load is applied so as to improve the response of the control, the output voltage descending rate of the power generator 4 does not increase and it is possible to early restore the actual engine rotational speed Ne. Further, since the injection amount detector having a complex structure is not required and it is possible to utilize the engine rotational speed detector which is employed for controlling the engine rotational speed, it is possible to achieve a simpler control apparatus.

A description will be given of a timing of an output voltage control in accordance with the present embodiment with reference to FIG. 12.

Figure 12:
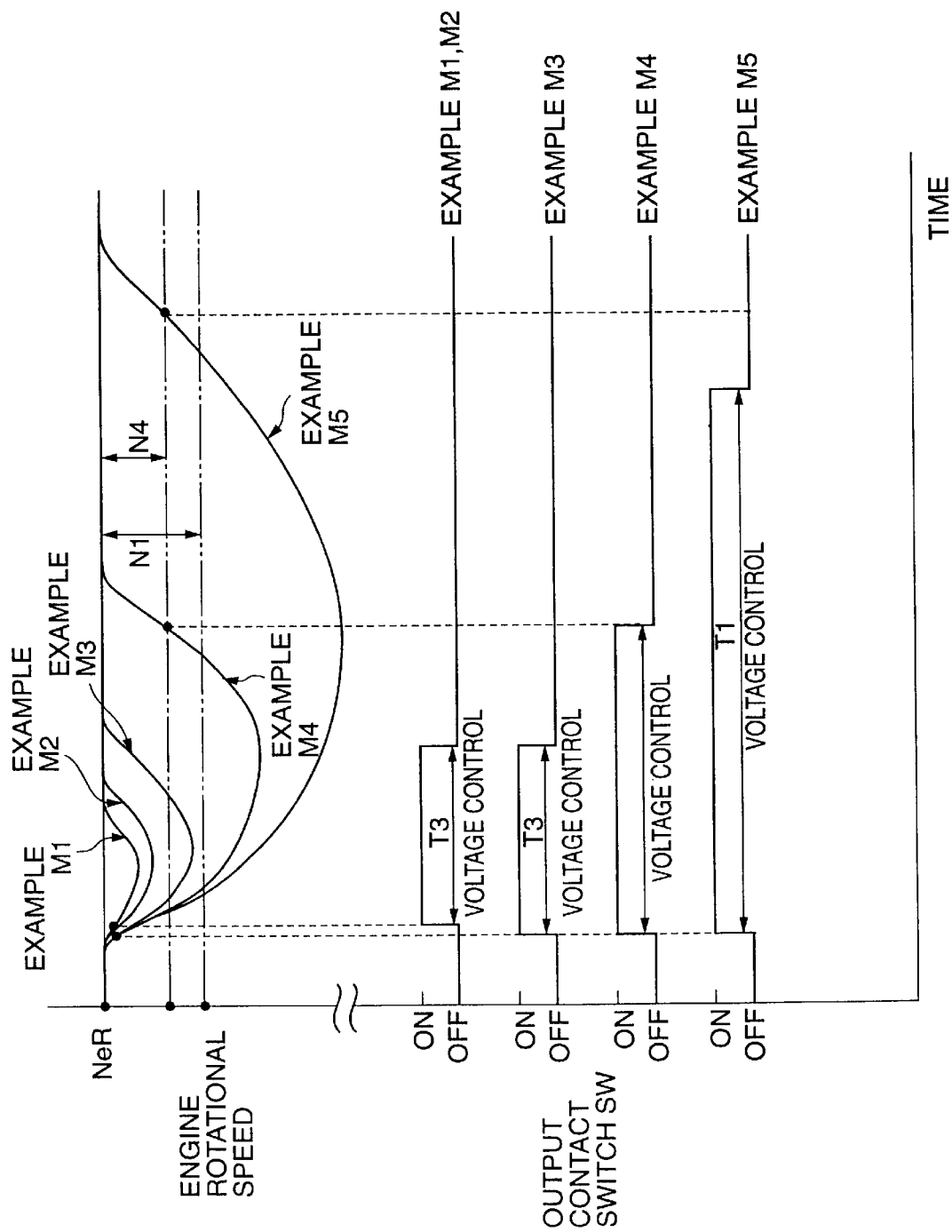
FIG. 12 is a graph which shows a relation between a change of the engine rotational speed and an operation of an output contact in the fourth embodiment shown in FIG. 11.

As in the case of examples M1, M2 and M3 shown in FIG. 12, even when the actual engine rotational speed Ne is equal to or more than the predetermined first target value (NeR−N1) (S48), the on state of the corresponding output contact switch SW, that is, the output voltage control is maintained until the on time of the corresponding output contact switch SW has passed the third threshold T3 (0.5 sec in the present embodiment) of the control time (S49). Accordingly, in the case that the load of the power generator is small after starting the output voltage control, it is possible to securely restore the output voltage without reducing the output voltage at a degree equal to or more than necessity.

Further, when the actual engine rotational speed Ne is smaller than the predetermined first target value (NeR−N1) (S48), the output voltage is maintained until the actual engine rotational speed Ne becomes larger than the predetermined fourth target value (NeR−N4) (S50) as in the example M4 or the on time of the corresponding output contact switch SW has passed the first threshold T1 (1.5 sec in the present embodiment) of the control time (S47) as in the example M5. Accordingly, after starting the output voltage control, it is possible to securely restore the output voltage so as to secure a stability of the actual engine rotational speed Ne and it is possible to prevent the voltage of the power generator from being reduced to a level equal to or more than the first threshold T1 so as to secure a stability of the output voltage coinciding with the standard of the power generator.

Further, when finishing the output voltage control and turning off all the output contact switches SW, the off state of all the output contact switches SW is maintained until the off time of all the output contact switches SW has passed the second threshold T2 (6 second in the present embodiment, however which is determined in accordance with a frequency of the sudden load input) (S43). Accordingly, it is possible to stably control the output voltage of the power generator without again starting the output voltage control during the second threshold T2.

In this case, in the embodiment explained above, the circuit structure for inputting the adjustment voltage command value to the automatic voltage adjuster 6 is not limited to the structure shown in FIG. 1, the structure may be made as far as a predetermined number of resistances and switch means which can switch a predetermined parallel and/or series connection of the resistances in correspondence to the adjustment voltage command signal of the engine controller 3.

Figure 13:
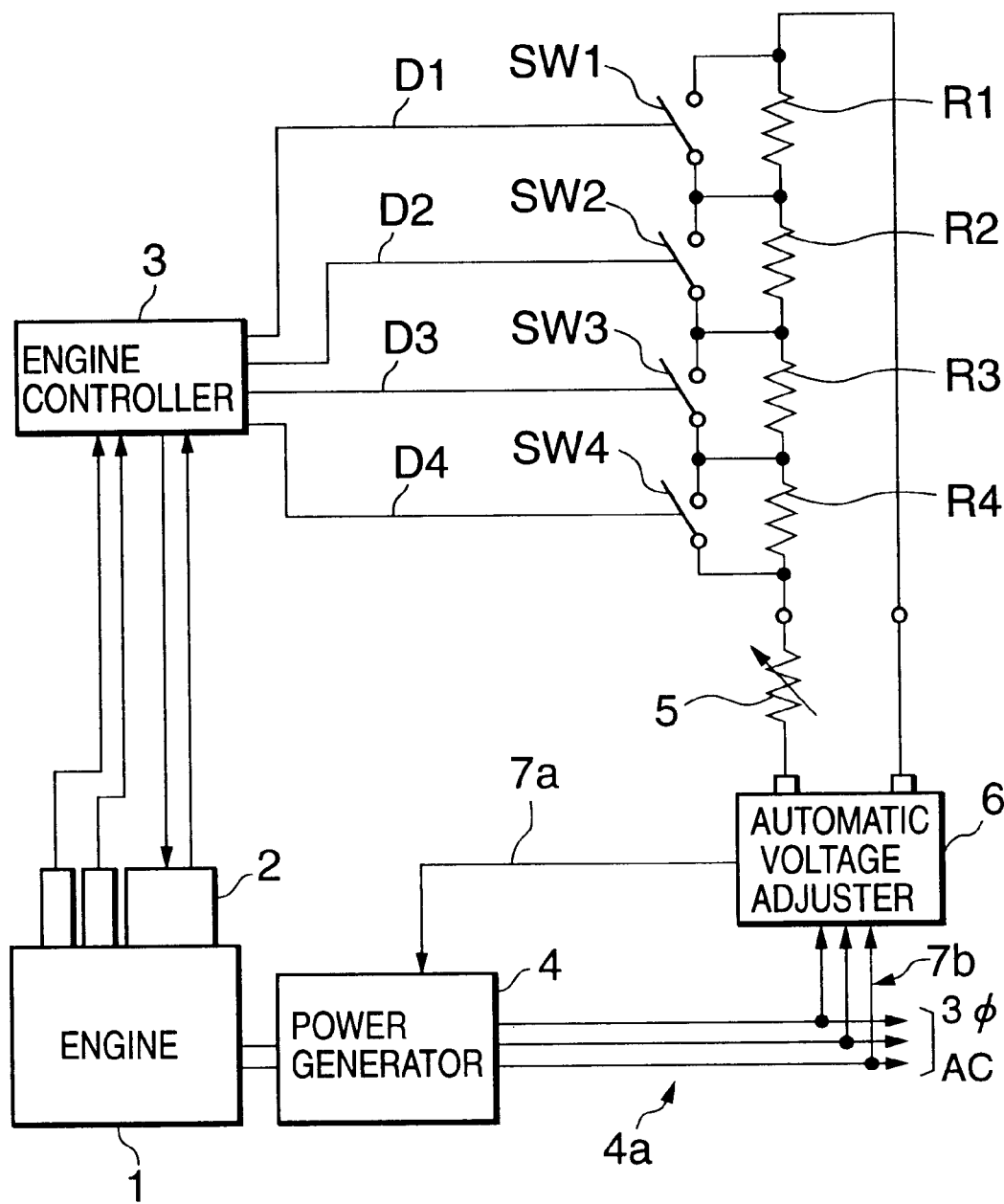
FIG. 13 is a schematic block diagram which shows a second embodiment of a voltage control apparatus of an engine generator in accordance with the present invention.

FIG. 13 is a schematic block diagram of a second embodiment of a voltage control apparatus of an engine generator in accordance with the present invention, in which the resistances R1, R2, R3 and R4 and the variable resistance 5 are arranged in series, the output contacts SW1, SW2, SW3 and SW4 of relays (an example of the switch means) for switching a short-circuit or a connection of the respective resistances are connected to the respective resistances, and the engine controller 3 may be respectively connected to the coils (not shown) of the respective relays by wires D1, D2, D3 and D4. Further, the relays having the output contacts SW1, SW2, SW3 and SW4 are not limited to this, may be the switch means which can switch the series and/or parallel connection of the resistances and may be a semiconductor switch, for example, a transistor and the like.

Further, in the present embodiment, the means for detecting the fuel injection amount is not limited to the rack sensor 11, and may be, for example, a method of determining on the basis of an open time of a fuel supply electromagnetic valve of a fuel injection pump by the engine controller 3 or a method of previously setting a relation among the fuel injection pressure, the engine rotational speed and the fuel injection amount in a map or the like and calculating the fuel injection amount on the basis of the fuel injection pressure and the engine rotational speed detected during the engine operation in accordance with the map.

What is claimed is:

1. A method of controlling a voltage of an engine generator comprising the steps of:

detecting an actually measured value of an engine rotational speed at every predetermined time; and controlling an output voltage of a power generator in accordance with a deviation value between a first predetermined target value of said engine rotational speed and the actually measured value of said engine rotational speed when the actually measured value of said engine rotational speed is equal to or less than said first predetermined target value of said engine rotational speed, wherein when the actually measured value of said engine rotational speed is equal to or more than a second predetermined target value of said engine rotational speed that is lower than the first predetermined target value of said engine rotational speed, a state having a rotational speed lower than the first predetermined target value of said engine rotational speed continues, and a continuing time is over a predetermined first threshold during the output voltage control of said power generator, a control of returning said power generator to a rated output voltage is performed, and wherein when the output voltage of said power generator is controlled to be returned from a voltage lower than a rated voltage to the rated voltage, the output voltage lower than the rated voltage can be controlled after the continuing time exceeds a predetermined second threshold.

2. A method of controlling a voltage of an engine generator comprising the steps of:

detecting an actually measured value of a fuel injection amount of an engine and an actually measured value of a rotational speed at every predetermined time; and controlling an output voltage of a power generator in accordance with a deviation value between a predetermined target value of the fuel injection amount and the actually measured value of said fuel injection amount with respect to the actually measured value of the rotational speed, wherein when the actually measured value of said engine rotational speed is equal to or more than a second predetermined target value of said engine rotational speed that is lower than a first predetermined target value of said engine rotational speed, a state having a rotational speed lower than the first predetermined target value of said engine rotational speed continues, and a continuing time is over a predetermined first threshold during the output voltage control of said power generator, a control of returning said power generator to a rated output voltage is performed, and wherein when the output voltage of said power generator is controlled to be returned from a voltage lower than a rated voltage to the rated voltage, the output voltage lower than the rated voltage can be controlled after the continuing time exceeds a predetermined second threshold.

3. A method of controlling a voltage of an engine generator as claimed in claim 2, wherein when controlling the output voltage of said power generator in accordance with the deviation value between the predetermined target value of the fuel injection amount and the actually measured value of said fuel injection amount with respect to the actually measured value of said rotational speed, in the case that the actually measured value of the fuel injection amount is equal to the predetermined target value of the fuel injection amount, the output voltage of said power generator is controlled in accordance with a deviation value between the first predetermined target value of said rotational speed and the actually measured value of said rotational speed.

4. A method of controlling a voltage of an engine generator comprising the steps of:

detecting an actually measured value of a rotational speed of an engine and an actually measured value of a fuel injection amount at every predetermined time;

controlling an output voltage of a power generator in accordance with a deviation value between a predetermined target value of the fuel injection amount and the actually measured value of said fuel injection amount with respect to the actually measured value of said rotational speed when the actually measured value of the rotational speed is greater than a predetermined target value of the rotational speed; and controlling the output voltage of said power generator in accordance with a deviation value between the predetermined target value of said rotational speed and the actually measured value of said rotational speed when the actually measured value of said rotational speed is equal to or less than the predetermined target value of said rotational speed.

5. A method of controlling a voltage of an engine generator as claimed in claim 3, wherein when controlling the output voltage of said power generator in accordance with the deviation value between the predetermined target value of the fuel injection amount and the actually measured value of the fuel injection amount with respect to the actually measured value of said rotational speed, in the case that the actually measured value of the fuel injection amount is equal to the predetermined target value of the fuel injection amount, the output voltage of said power generator is controlled in accordance with the deviation value between the predetermined target value of said rotational speed and the actually measured value of said rotational speed.

6. A method of controlling a voltage of an engine generator as claimed in claim 3, wherein when the actually measured value of said engine rotational speed is equal to or more than a second target value of said engine rotational speed that is lower than the predetermined target value of said engine rotational speed, a state having a rotational speed lower than the predetermined target value of said engine rotational speed continues, and a continuing time is over a predetermined first threshold during the output voltage control of said power generator, a control of returning said power generator to a rated output voltage is performed.

7. A method of controlling a voltage of an engine generator as claimed in claim 3, wherein when the output voltage of said power generator is controlled to be returned from a voltage lower than a rated voltage to the rated voltage, the output voltage lower than the rated voltage can be controlled after a continuing time exceeds a predetermined second threshold.

8. A method of controlling a voltage of an engine generator comprising the steps of:

detecting an actually measured value of an engine rotational speed at every predetermined time; and controlling an output voltage of a power generator on the basis of only a time change rate of the actually measured value of said engine rotational speed.

9. A method of controlling a voltage of an engine generator as claimed in claim 8, wherein when the time change rate of the actually measured value of said engine rotational speed is reduced to a level equal to or less than a predetermined value, output voltage control of said power generator is started.

10. A method of controlling a voltage of an engine generator as claimed in claim 8, wherein the control is performed by changing the output voltage value of said power generator in accordance with the time change rate of the actually measured value of said engine rotational speed.

11. A method of controlling a voltage of an engine generator as claimed in claim 8, 9 or 10, wherein the output voltage is maintained until at least a third threshold or more of the control time has passed after starting the output voltage control of said power generator.

12. A method of controlling a voltage of an engine generator as claimed in claim 8, 9 or 10, wherein when a first threshold or more of a control time has passed after starting the output voltage control of said power generator, the output voltage control is stopped and a control of returning to the rated output voltage is performed.

13. A method of controlling a voltage of an engine generator as claimed in claim 12, wherein when the actually measured value of said engine rotational speed becomes equal to or more than a predetermined fourth target value during said output voltage control, the output voltage control is stopped and a control of returning to the rated output voltage is performed.

14. A method of controlling a voltage of an engine generator as claimed in claim 12, wherein the output voltage control is continued when the actually measured value of said engine rotational speed becomes equal to or less than a predetermined first target value during said output voltage control, and the output voltage control is stopped and a control of returning to the rated output voltage is performed when a third threshold shorter than the first threshold of the control time has passed after starting the output voltage control and the actually measured value of said engine rotational speed becomes equal to or more than a predetermined fourth target value higher than the predetermined first target value.

* * * * *